(12) United States Patent
Troyansky et al.

(10) Patent No.: US 7,859,725 B2
(45) Date of Patent: *Dec. 28, 2010

(54) SYSTEM AND METHOD FOR MONITORING UNAUTHORIZED DISSEMINATION OF DOCUMENTS AND PORTABLE MEDIA

(75) Inventors: Lidror Troyansky, Givataim (IL); Ofir Carny, Kochav-Yair (IL); Ariel Peled, Even-Yehuda (IL)

(73) Assignee: PortAuthority Technologies Inc., San Diego, CA (US)

( * ) Notice: Subject to any disclaimer, the term of this patent is extended or adjusted under 35 U.S.C. 154(b) by 432 days.

This patent is subject to a terminal disclaimer.

(21) Appl. No.: 12/000,876

(22) Filed: Dec. 18, 2007

(65) Prior Publication Data
US 2008/0094654 A1    Apr. 24, 2008

Related U.S. Application Data

(62) Division of application No. 10/504,852, filed as application No. PCT/IL03/00154 on Feb. 27, 2003, now Pat. No. 7,331,725.

(60) Provisional application No. 60/359,925, filed on Feb. 28, 2002.

(51) Int. Cl.
| | |
|---|---|
| *G06F 21/00* | (2006.01) |
| *G06F 21/24* | (2006.01) |
| *G06F 17/00* | (2006.01) |
| *G06K 15/00* | (2006.01) |
| *G06K 19/00* | (2006.01) |
| *B41M 3/14* | (2006.01) |
| *G08B 21/00* | (2006.01) |
| *H04L 9/00* | (2006.01) |

(52) U.S. Cl. .......... 358/3.28; 358/1.14; 705/51; 705/57; 726/26; 726/31; 713/189; 713/194; 340/572.1; 340/5.2; 340/5.8

(58) Field of Classification Search .......... 358/1.1, 358/1.9, 3.28, 1.18, 401, 403, 464, 1.14, 358/1.15; 705/51, 57, 58; 726/26, 31, 32; 382/101, 305, 100; 340/5.86, 5.2, 5.8, 539.1, 340/572.1, 572.5; 707/781; 713/189, 194; 283/73, 82, 85, 94
See application file for complete search history.

(56) References Cited

U.S. PATENT DOCUMENTS

| | | | |
|---|---|---|---|
| 5,652,793 | A | 7/1997 | Priem et al. |
| 5,835,911 | A | 11/1998 | Nakagawa et al. |
| 5,886,634 | A | 3/1999 | Muhme |
| 5,933,498 | A | 8/1999 | Schneck et al. |
| 6,314,409 | B2 | 11/2001 | Schneck et al. |

(Continued)

OTHER PUBLICATIONS

Official Action Dated May 3, 2007 From the US Patent and Trademark Office Re.: U.S. Appl. No. 10/504,852.

(Continued)

*Primary Examiner*—Scott A Rogers

(57) ABSTRACT

A method for enforcing a distribution policy associated with an electronic document comprising the steps of: sending the document to an output device; determining said distribution policy associated with said document; instructing a marking module to embed a marking indicating at least the existence of said distribution policy on an output form of said electronic document produced by said output device, said marking being readable to enforce said associated marking policy.

49 Claims, 12 Drawing Sheets

U.S. PATENT DOCUMENTS

| | | |
|---|---|---|
| 6,345,294 B1 | 2/2002 | O'Toole et al. |
| 6,492,905 B2 | 12/2002 | Mathias et al. |
| 6,611,607 B1 * | 8/2003 | Davis et al. .................. 382/100 |
| 7,493,650 B2 * | 2/2009 | Peled et al. .................... 726/1 |
| 7,643,164 B2 * | 1/2010 | Peled et al. ................. 358/1.15 |
| 7,657,944 B2 * | 2/2010 | Kanno ........................... 726/27 |
| 7,669,225 B2 * | 2/2010 | Peled et al. ..................... 726/1 |
| 2003/0190054 A1 * | 10/2003 | Troyansky et al. .......... 382/100 |
| 2004/0021549 A1 * | 2/2004 | Choi et al. ................... 340/5.8 |
| 2005/0134896 A1 * | 6/2005 | Koga .......................... 358/1.14 |
| 2005/0144134 A1 * | 6/2005 | Hirano ......................... 705/51 |
| 2005/0168766 A1 | 8/2005 | Troyansky et al. |
| 2007/0165904 A1 * | 7/2007 | Nudd et al. ................. 382/100 |

OTHER PUBLICATIONS

Official Action dated Dec. 4, 2006 From the US Patent and Trademark Office Re.: U.S. Appl. No. 10/540,852.

* cited by examiner

SYSTEM AND METHOD FOR MONITORING UNAUTHORIZED DISSEMINATION OF DOCUMENTS AND PORTABLE MEDIA

RELATED APPLICATIONS

This application is a Divisional of U.S. patent application Ser. No. 10/504,852 filed on 27 Aug. 2004 which is a National Phase Application of PCT/IL03/00154 having International Filing Date of 27 Feb. 2003, which claims priority from U.S. Provisional Patent Application No. 60/359,925 filed 28 Feb. 2002.

FIELD OF THE INVENTION

The present invention relates to monitoring unauthorized dissemination of printed documents and portable media, particularly but not exclusively for the enforcement of secrecy and/or confidentiality.

BACKGROUND OF THE INVENTION

Modern businesses and industries relay heavily on digital documents as a primary means of communication and documentation. The proliferation of desktop and office printers has led to an incredible increase in the quantity of printed documents. In many cases, the printed documents contain proprietary and/or confidential material. These documents can easily be brought outside the company site in an unauthorized manner, either by overly devoted employees who wishes to keep-on working on the documents outside the company site, or maliciously, by employees who deliberately give away confidential and/or proprietary material to unauthorized third party. Companies are at daily risk of disclosing sensitive internal documents, leading to substantial financial losses. Banking, legal, medical, government, and manufacturing companies have much to lose if sensitive internal documents are leaked. The safe distribution of internal documents, memos, blueprints, payroll records, patient medical information, banking and financial transactions etc, is becoming more complex to ensure. In fact, as a consequence of such leaks, the United States federal government was prompted to intervene and has mandated that companies should protect sensitive information such as financial and patient medical records. From the companies and businesses standpoint, potential risks include financial losses, fiduciary risks, legal problems, competitive intelligence, public relations problems, loss of clients and privacy liability. There is therefore a great interest in methods that may mitigate disclosure of confidential printed documents.

Another related issue is the issue of document retention policy: a policy that limits liability and leakage hazards by destroying documents after the minimal time required by law and practice. The ease of making a large number of copies from each information item makes it hard to ensure that all the copies of given information item have really been destroyed. Current methods do not provide an efficient solution to enforce a required document retention policy.

There is thus a recognized need for, and it would be highly advantageous to have, a method and system that allows monitoring and controlling of unauthorized dissemination of printed documents and portable media and efficient enforcement of document retention policy, which will overcome the drawbacks of current methods as described above.

SUMMARY OF THE INVENTION

The present invention seeks to provide a method and system for the mitigation of illegal and unauthorized disclosure of printed documents and portable media and for improved enforcement of document retention policy, without otherwise interfering with rightful usage and the privacy of the users. Specifically, the current invention provides methods that allow detection of unauthorized attempts to disseminate printed documents and portable digital media from restricted zones and to monitor the distraction of information according to the organizational policy.

In a preferred embodiment of the present invention the system does not allows printing of a confidential document, unless it is printed on a special paper and/or using a special printer. Such special papers may contain an embedded apparatus that allows remote detection using electromagnetic means (e.g., embedded electronic resonant circuit with a capacitor and a coil (LC circuit), radio frequency identification microchips (RFID), or conducting segments that can serve as matched dipole antennas) and/or radioactive means. The special printer uses conductive ink in order to print detectable apparatus, e.g., electronic resonant circuit with a capacitor and a coil (LC circuit), that are printed on a paper using conductive and insulating ink, preferably in a manner that does not reduce the quality of the document. The exits from the restricted zone may thereafter be equipped with electromagnetic detectors that would alert whenever restricted documents are taken-out of the restricted zone. Upon detection of unauthorized removal attempts, the system preferably audits the details and enforces a pre-determined policy, such as closing the exit gate, providing an audible alarm etc.

According to a first aspect of the present invention there is provided a method for enforcing a distribution policy associated with an electronic document comprising the steps of:

sending the document to an output device;

Determining the distribution policy associated with the document; instructing a marking module to embed a marking indicating at least the existence of the distribution policy on an output form of the electronic document produced by the output device, the marking being readable to enforce the associated marking policy.

In another preferred embodiment of the present invention, the method further comprise the marking comprises at least one of the following:

Marking which is not substantially visually perceptible;

Marking which is not substantially visually discernable from a background;

a marking comprising a plurality of layers;

a plurality of markings;

a plurality of layers of markings, each layer comprising different information;

a plurality of markings, each comprising different information;

a plurality of different markings each layer comprising a different marking technique;

a plurality of layers of markings each layer comprising several different marking techniques;

Marking which is substantially difficult to remove;

Marking which is difficult to substantially damage;

Marking operable to be localized; and

Marking operable to be localized by triangulation.

In another preferred embodiment of the present invention, the method further comprise the marking comprise at least one of the following:

An arrangement embedded into the output that can be detected using electromagnetic means;

A radio frequency remote identification device;

An electronic circuit;

An electronic resonant circuit;

An electronic resonant circuit comprising a capacitor and a coil;

Matched dipole antenna;

radiation emitting material;

Magnetic substance;

Antenna;

Microwave detectable component;

Excite-able quantum system;

Piezoelectric component; and

Acoustic resonator.

In another preferred embodiment of the present invention, the method further comprise the output comprises printing on paper, and the marking comprises at least one of the following:

An apparatus embedded in the paper;

Conductive ink;

A Printable electronic component;

Magnetic ink;

A Conductive segment;

detectable chemicals;

Barcode; and

Visible marking.

In another preferred embodiment of the present invention, the method further comprise:

detecting marking embedded in the output using a marking detection technique; and notifying at least one distribution policy enforcement facilitation module of the detection of the marking; thereby to enable the distribution policy enforcement facilitation module to perform a policy enforcement action according to the notification.

In another preferred embodiment of the present invention, the method further comprise the policy enforcement action comprising at least one of the following:

Logging the notification;

Reporting the notification;

Logging and reporting the notification;

Providing an alert;

Sounding an alarm;

Obstructing the exit of the document from a restricted area;

Obstructing the exit of the document from a restricted area by closing an exit;

Preventing a copying device from copying the document;

Preventing a writing device from writing the document to digital media;

Preventing a writing device from writing the document on unmarked digital media;

Preventing a copying device from making an unmarked copy of the detected marked document; and Causing a copying device to embed marking on copies it creates following the detection.

In another preferred embodiment of the present invention, the method further comprise utilizing at least one of the following techniques:

Tamper resistance for marks placed on the output;

Tamper detection for marks placed on the output, the tamper detection for detecting attempts at tampering;

Tamper resistance for a device used for detection of the marks;

Tamper detection for a device used for detection of the mark, the tamper detection for detecting attempts at tampering;

Tamper resistance for a device used for enforcement of the policy;

Tamper detection for a device used for enforcement of the policy, the tamper detection for detecting attempts at tampering;

Cryptography within the marking;

Cryptography for communication with output devices;

Encryption of marks;

Encryption of communication with output devices;

Encryption of communications concerning the distribution policy;

Utilizing a rule based distribution policy to derive a policy for a given document;

Rule based policy analyzing;

Utilizing a document management system for control of distribution policy over a plurality of documents;

Integration with a document management system;

Importing of documents;

Enforcing a document retention policy;

Access control;

Utilizing a personnel identification device operable to identify personnel in association with the documents;

Utilizing a personnel identification device operable to identify personnel attempting to perform an action related to the document;

Access control to at least one storage device;

Access control to at least one storage device for enforcement by the storage device;

Utilizing Optical Character Recognition to analyze the contents of documents in output form;

Utilizing Optical Character Recognition to analyze the contents of marks embedded within documents in output form;

Inserting marks in the form of bar codes and utilizing bar code reading to identify the marks;

Utilizing tamper resistant hardware; and

Triangulation for position location.

In another preferred embodiment of the present invention, the method further comprise defining at least two zones, such that a document is allowed to be in a first restricted zone, and is not allowed to be in a second, non-restricted, zone, and the enforcing comprises actions preventing transfer of the output form from the first zone to the second zone.

In another preferred embodiment of the present invention, the method further comprise the enforcing comprises selecting at least one of the following not allowing the creation of copies of the documents within the second zone; monitoring exits of the first zone utilizing marking detection; and monitoring the entrances of the second zone utilizing marking detection.

In another preferred embodiment of the present invention, the method further comprise defining at least two classes of documents, providing each class with a mark allowing the class to be distinguished, applying a different distribution policy for each class, defining at least three zones, defining that a first of the classes is allowed to be in a first restricted zone, defining that the first class is not allowed to be in a second restricted zone, defining that a second of the classes is allowed to be in the first restricted zone, defining that the second class is allowed to be in the second restricted zone, defining that the second class is not allowed to be in a third non-restricted zone, defining that the first class is not allowed to be in the third not restricted zone, and the enforcing comprises actions controlling transfer of the output form between the respective zones in accordance with the definitions.

In another preferred embodiment of the present invention, the method further comprise the enforcing comprises selecting at least one of:

not allowing the creation of copies of documents of the first class within the second restricted zone;

monitoring the exits of the first restricted zone utilizing marking detection;

monitoring the exits of the second restricted zone utilizing marking detection;

monitoring the entrances of the second restricted zone utilizing marking detection devices; and monitoring the entrances of the third not restricted zone utilizing marking detection.

In another preferred embodiment of the present invention, the method further comprise the marking comprises indication about at least one of the following:

distribution policy related information for an associated document;

distribution policy related information;

reference to a database;

reference to a database comprising distribution policy related information for an associated document;

reference to a database comprising distribution policy related information; and an identification of an associated document.

In another preferred embodiment of the present invention, the method further comprise the marking comprise indication about at least one of the following:

information about the contents of an associated document;

Allowed recipients information for an associated document page number information for the page of a copy of an associated document;

copy number information for a copy of an associated document;

copy identification information for a copy of an associated document;

author identity information for an associated document;

managing personnel identity, information for an associated document;

classification level information for an associated document;

printing permission information for an associated document;

copying permission information for an associated document;

removal from restricted zone permission information for an associated document;

usage restriction information for an associated document; and

Access control information for an associated document.

In another preferred embodiment of the present invention, the method further comprise embedding marking detection functionality into at least one of the following devices:

a portable media writing device;

an optical portable media writing device;

a magnetic portable media writing device;

a CD writer;

a DVD writer;

a diskette drive;

a magnetic tape writer;

a zip disk drive;

a flash memory card writing device;

a portable storage device interface;

a USB interface;

a bluetooth interface;

a firewire interface;

a IDE interface;

a SCSI interface;

a TCP/IP interface;

a infrared interface;

a wireless interface; and a RF interface.

In another preferred embodiment of the present invention, the method further comprise embedding marking detection functionality into at least one of the following devices:

a scanning device;

a scanner;

a printing device;

a printer;

a plotter;

a copying device;

a photocopier;

a fax machine;

a document destruction device; and a shredder.

In another preferred embodiment of the present invention, the method further comprise embedding the marking detection functionality into a document destruction device, thereby to enable the distribution policy enforcement facilitation module to monitor at least one of the following:

The number of copies of the document that have been created and not destroyed;

The number of copies of the document that have been created and destroyed;

The identity of copies of the document that have been created and not destroyed;

The identity of copies of the document that have been created and destroyed;

The identity of pages of copies of the document that have been created and not destroyed;

The identity of pages of copies of the document that were created and destroyed;

The identity of sections of copies of the document that have been created and not destroyed; and The identity of sections of copies of the document that have been created and destroyed.

In another preferred embodiment of the present invention, the method further comprise embedding the marking detection functionality into a document destruction device, thereby to enable the distribution policy enforcement facilitation module to monitor at least one of the following:

identities of persons possessing copies of the documents that have been created and not destroyed;

identities of persons possessing copies of the document that have been created and not destroyed;

identities of persons possessing pages of copies of the documents which have been created and not destroyed;

identities of persons possessing sections of copies of the documents which have been created and not destroyed;

identities of persons possessing copies of the documents that have been created and not destroyed, the identity being discerned by utilizing a personnel identification device;

identities of persons possessing copies of the documents that have been created and not destroyed, the identity being discernable by utilizing a personnel identification device;

identities of persons possessing pages of copies of the documents that have been created and not destroyed, the identity being discernable by utilizing a personnel identification device; and identities of persons possessing sections of copies of the documents that have been created and not destroyed, the identity being discernable by utilizing a personnel identification device.

In another preferred embodiment of the present invention, the method further comprise the output form of the document comprises at least one of one of the following:

A printed copy of the document;

A digital copy of the document;

A copy of the document stored on portable media;

A copy of the document stored on portable storage device;

A copy of the document stored an optical portable media;

A copy of the document stored on a magnetic portable media;

A copy of the document stored an optical media;

A copy of the document stored on a magnetic media;

A copy of the document stored on a CD;

A copy of the document stored on a DVD;

A copy of the document stored on a diskette;

A copy of the document stored on a magnetic tape;

A copy of the document stored on a zip disk; and

A copy of the document stored on a flash memory card.

In another preferred embodiment of the present invention, the method further comprise the distribution policy comprises a retention policy.

According to a second aspect of the present invention there is provided a method for enforcing a distribution policy for documents comprising the steps of:

embedding marking functionality within an electronic document output device,

Using the output device to produce output of an electronic document in output form; and Embedding distribution policy related information for the document on the output form using the marking functionality.

In another preferred embodiment of the present invention, the method further comprise the embedding distribution policy related information embedding comprise at least one of the following:

An arrangement embedded into the output that can be detected using electromagnetic means;

A radio frequency remote identification device;

An electronic circuit;

An electronic resonant circuit;

An electronic resonant circuit comprising a capacitor and a coil;

Matched dipole antenna;

radiation emitting material;

Magnetic substance;

Antenna;

Microwave detectable component;

Excite-able quantum system;

Piezoelectric component; and

Acoustic resonator.

In another preferred embodiment of the present invention, the method further comprise the output comprises printing on paper, and the embedding distribution policy related information embedding comprises at least one of the following:

An apparatus embedded in the paper;

Conductive ink;

A Printable electronic component;

Magnetic ink;

A Conductive segment;

detectable chemicals;

Barcode; and

Visible marking.

In another preferred embodiment of the present invention, the method further comprise the embedding distribution policy related information embedding comprise at least one of the following:

Marking which is not substantially visually perceptible;

Marking which is not substantially visually discernable from a background;

a marking comprising a plurality of layers;

a plurality of markings;

a plurality of layers of markings, each layer comprising different information;

a plurality of markings, each comprising different information;

a plurality of different markings each layer comprising a different marking technique;

a plurality of layers of markings each layer comprising several different marking techniques;

Marking which is substantially difficult to remove;

Marking which is difficult to substantially damage;

Marking operable to be localized; and

Marking operable to be localized by triangulation.

In another preferred embodiment of the present invention, the method further comprise distribution policy related information in embedded in the document, the method further comprising the steps of:

Detecting the distribution policy related information embedded in the document using a marking decoding device;

Determining a distribution policy using the detected related information; and notifying at least one distribution policy enforcement facilitation module of the distribution policy; thereby to enable the distribution policy enforcement facilitation module to perform an enforcement action according to the notification.

In another preferred embodiment of the present invention, the method further comprise the policy enforcement action comprising at least one of the following;

Logging the notification;

Reporting the notification;

Logging and reporting the notification;

Providing an alert;

Sounding an alarm;

Obstructing the exit of the document from a restricted area;

Obstructing the exit of the document from a restricted area by closing an exit;

Preventing a copying device from copying the document;

Preventing a writing device from writing the document to digital media;

Preventing a writing device from writing the document on unmarked digital media;

Preventing a copying device from making an unmarked copy of the detected marked document; and Causing a copying device to embed marking on copies it creates following the detection.

In another preferred embodiment of the present invention, the method further comprise utilizing at least one of the following techniques:

Tamper resistance for marks placed on the output;

Tamper detection for marks placed on the output, the tamper detection for detecting attempts at tampering;

Tamper resistance for a device used for detection of the marks;

Tamper detection for a device used for detection of the mark, the tamper detection for detecting attempts at tampering;

Tamper resistance for a device used for enforcement of the policy;

Tamper detection for a device used for enforcement of the policy, the tamper detection for detecting attempts at tampering;

Cryptography within the marking;

Cryptography for communication with output devices;

Encryption of marks;

Encryption of communication with output devices;

Encryption of communications concerning the distribution policy;

Utilizing a rule based distribution policy to derive a policy for a given document;

Rule based policy analyzing;

Utilizing a document management system for control of distribution policy over a plurality of documents;

Integration with a document management system;

Importing of documents;

Enforcing a document retention policy;

Access control;

Utilizing a personnel identification device operable to identify personnel in association with the documents;

Utilizing a personnel identification device operable to identify personnel attempting to perform an action related to the document;

Access control to at least one storage device;

Access control to at least one storage device for enforcement by the storage device;

Utilizing Optical Character Recognition to analyze the contents of documents in output form;

Utilizing Optical Character Recognition to analyze the contents of marks embedded within documents in output form;

Inserting marks in the form of bar codes and utilizing bar code reading to identify the marks;

Utilizing tamper resistant hardware; and

Triangulation for position location.

In another preferred embodiment of the present invention, the method further comprise defining at least two zones, such that a document is allowed to be in a first restricted zone, and is not allowed to be in a second, non-restricted, zone, and the enforcing comprises actions preventing transfer of the output form from the first zone to the second zone.

In another preferred embodiment of the present invention, the method further comprise the enforcing comprises selecting at least one of the following not allowing the creation of copies of the documents within the second zone;

monitoring exits of the first zone utilizing marking detection; and monitoring the entrances of the second zone utilizing marking detection.

In another preferred embodiment of the present invention, the method further comprise defining at least two classes of documents, providing each class with a mark allowing the class to be distinguished, applying a different distribution policy for each class, defining at least three zones, defining that a first of the classes is allowed to be in a first restricted zone, defining that the first class is not allowed to be in a second restricted zone, defining that a second of the classes is allowed to be in the first restricted zone, defining that the second class is allowed to be in the second restricted zone, defining that the second class is not allowed to be in a third non-restricted zone, defining that the first class is not allowed to be in the third not restricted zone, and the enforcing comprises actions controlling transfer of the output form between the respective zones in accordance with the definitions.

In another preferred embodiment of the present invention, the method further comprise the enforcing comprises selecting at least one of:

not allowing the creation of copies of documents of the first class within the second restricted zone;

monitoring the exits of the first restricted zone utilizing marking detection;

monitoring the exits of the second restricted zone utilizing marking detection;

monitoring the entrances of the second restricted zone utilizing marking detection devices; and monitoring the entrances of the third not restricted zone utilizing marking detection.

In another preferred embodiment of the present invention, the method further comprise the marking comprises indication about at least one of the following:

distribution policy related information for an associated document;

distribution policy related information;

reference to a database;

reference to a database comprising distribution policy related information for an associated document;

reference to a database comprising distribution policy related information; and an identification of an associated document.

In another preferred embodiment of the present invention, the method further comprise the marking comprise indication about at least one of the following:

information about the contents of an associated document;

Allowed recipients information for an associated document page number information for the page of a copy of an associated document;

copy number information for a copy of an associated document;

copy identification information for a copy of an associated document;

author identity information for an associated document;

managing personnel identity, information for an associated document;

classification level information for an associated document;

printing permission information for an associated document;

copying permission information for an associated document;

removal from restricted zone permission information for an associated document;

usage restriction information for an associated document; and

Access control information for an associated document.

In another preferred embodiment of the present invention, the method further comprise embedding marking detection functionality into at least one of the following devices:

a portable media writing device;

an optical portable media writing device;

a magnetic portable media writing device;

a CD writer;

a DVD writer;

a diskette drive;

a magnetic tape writer;

a zip disk drive;

a flash memory card writing device;

a portable storage device interface;

a USB interface;

a bluetooth interface;

a firewire interface;

a IDE interface;

a SCSI interface;

a TCP/IP interface;

a infrared interface;

a wireless interface; and a RF interface.

In another preferred embodiment of the present invention, the method further comprise embedding marking detection functionality into at least one of the following devices:

a scanning device;

a scanner;

a printing device;

a printer;

a plotter;

a copying device;

a photocopier;

a fax machine;

a document destruction device; and a shredder.

In another preferred embodiment of the present invention, the method further comprise embedding the marking detection functionality into a document destruction device, thereby to enable the distribution policy enforcement facilitation to monitor at least one of the following:

The number of copies of the document that have been created and not destroyed;

The number of copies of the document that have been created and destroyed;

The identity of copies of the document that have been created and not destroyed;

The identity of copies of the document that have been created and destroyed;

The identity of pages of copies of the document that have been created and not destroyed;

The identity of pages of copies of the document that were created and destroyed;

The identity of sections of copies of the document that have been created and not destroyed; and The identity of sections of copies of the document that have been created and destroyed.

In another preferred embodiment of the present invention, the method further comprise embedding the marking detection functionality into a document destruction device, thereby to enable the distribution policy enforcement facilitation module to monitor at least one of the following:

identities of persons possessing copies of the documents that have been created and not destroyed;

identities of persons possessing copies of the document that have been created and not destroyed;

identities of persons possessing pages of copies of the documents which have been created and not destroyed;

identities of persons possessing sections of copies of the documents which have been created and not destroyed;

identities of persons possessing copies of the documents that have been created and not destroyed, the identity being discerned by utilizing a personnel identification device;

identities of persons possessing copies of the documents that have been created and not destroyed, the identity being discernable by utilizing a personnel identification device;

identities of persons possessing pages of copies of the documents that have been created and not destroyed, the identity being discernable by utilizing a personnel identification device; and identities of persons possessing sections of copies of the documents that have been created and not destroyed, the identity being discernable by utilizing a personnel identification device.

In another preferred embodiment of the present invention, the method further comprise the output form of the document comprises at least one of one of the following:

A printed copy of the document;

A digital copy of the document;

A copy of the document stored on portable media;

A copy of the document stored on portable storage device;

A copy of the document stored an optical portable media;

A copy of the document stored on a magnetic portable media;

A copy of the document stored an optical media;

A copy of the document stored on a magnetic media;

A copy of the document stored on a CD;

A copy of the document stored on a DVD;

A copy of the document stored on a diskette;

A copy of the document stored on a magnetic tape;

A copy of the document stored on a zip disk; and

A copy of the document stored on a flash memory card.

In another preferred embodiment of the present invention, the method further comprise the distribution policy comprises a retention policy.

According to a third aspect of the present invention there is provided a method for enforcing a distribution policy for documents comprising the steps of:

Detecting distribution policy related information embedded in the document using a marking decoding device, the distribution policy related information is embedded in the document;

Determining a distribution policy using a policy reference component based on the distribution policy related information embedded in the document;

notifying at least one distribution policy enforcement facilitation module of the distribution policy; and The distribution policy enforcement facilitation module performing an action according to the notification.

In another preferred embodiment of the present invention, the method further comprise the embedding distribution policy related information embedding comprise at least one of the following:

An arrangement embedded into the output that can be detected using electromagnetic means;

A radio frequency remote identification device;

An electronic circuit;

An electronic resonant circuit;

An electronic resonant circuit comprising a capacitor and a coil;

Matched dipole antenna;

radiation emitting material;

Magnetic substance;

Antenna;

Microwave detectable component;

Excite-able quantum system;

Piezoelectric component; and

Acoustic resonator.

In another preferred embodiment of the present invention, the method further comprise the output comprises printing on paper, and the embedding distribution policy related information embedding comprises at least one of the following:

An apparatus embedded in the paper;

Conductive ink;

A Printable electronic component;

Magnetic ink;

A Conductive segment;

detectable chemicals;

Barcode; and

Visible marking.

In another preferred embodiment of the present invention, the method further comprise the embedding distribution policy related information embedding comprise at least one of the following:

Marking which is not substantially visually perceptible;

Marking which is not substantially visually discernable from a background;

a marking comprising a plurality of layers;

a plurality of markings;

a plurality of layers of markings, each layer comprising different information;

a plurality of markings, each comprising different information;

a plurality of different markings each layer comprising a different marking technique;

a plurality of layers of markings each layer comprising several different marking techniques;

Marking which is substantially difficult to remove;

Marking which is difficult to substantially damage;

Marking operable to be localized; and

Marking operable to be localized by triangulation.

In another preferred embodiment of the present invention, the method further comprise the policy enforcement action comprising at least one of the following;

Logging the notification;

Reporting the notification;

Logging and reporting the notification;

Providing an alert;

Sounding an alarm;

Obstructing the exit of the document from a restricted area;

Obstructing the exit of the document from a restricted area by closing an exit;

Preventing a copying device from copying the document;

Preventing a writing device from writing the document to digital media;

Preventing a writing device from writing the document on unmarked digital media;

Preventing a copying device from making an unmarked copy of the detected marked document; and Causing a copying device to embed marking on copies it creates following the detection.

In another preferred embodiment of the present invention, the method further comprise utilizing at least one of the following techniques:

Tamper resistance for marks placed on the output;

Tamper detection for marks placed on the output, the tamper detection for detecting attempts at tampering;

Tamper resistance for a device used for detection of the marks;

Tamper detection for a device used for detection of the mark, the tamper detection for detecting attempts at tampering;

Tamper resistance for a device used for enforcement of the policy;

Tamper detection for a device used for enforcement of the policy, the tamper detection for detecting attempts at tampering;

Cryptography within the marking;

Cryptography for communication with output devices;

Encryption of marks;

Encryption of communication with output devices;

Encryption of communications concerning the distribution policy;

Utilizing a rule based distribution policy to derive a policy for a given document;

Rule based policy analyzing;

Utilizing a document management system for control of distribution policy over a plurality of documents;

Integration with a document management system;

Importing of documents;

Enforcing a document retention policy;

Access control;

Utilizing a personnel identification device operable to identify personnel in association with the documents;

Utilizing a personnel identification device operable to identify personnel attempting to perform an action related to the document;

Access control to at least one storage device;

Access control to at least one storage device for enforcement by the storage device;

Utilizing Optical Character Recognition to analyze the contents of documents in output form;

Utilizing Optical Character Recognition to analyze the contents of marks embedded within documents in output form;

Inserting marks in the form of bar codes and utilizing bar code reading to identify the marks;

Utilizing tamper resistant hardware; and

Triangulation for position location.

In another preferred embodiment of the present invention, the method further comprise defining at least two zones, such that a document is allowed to be in a first restricted zone, and is not allowed to be in a second, non-restricted, zone, and the enforcing comprises actions preventing transfer of the output form from the first zone to the second zone.

In another preferred embodiment of the present invention, the method further comprise the enforcing comprises selecting at least one of the following not allowing the creation of copies of the documents within the second zone; monitoring exits of the first zone utilizing marking detection; and monitoring the entrances of the second zone utilizing marking detection.

In another preferred embodiment of the present invention, the method further comprise defining at least two classes of documents, providing each class with a mark allowing the class to be distinguished, applying a different distribution policy for each class, defining at least three zones, defining that a first of the classes is allowed to be in a first restricted zone, defining that the first class is not allowed to be in a second restricted zone, defining that a second of the classes is allowed to be in the first restricted zone, defining that the second class is allowed to be in the second restricted zone, defining that the second class is not allowed to be in a third non-restricted zone, defining that the first class is not allowed to be in the third not restricted zone, and the enforcing comprises actions controlling transfer of the output form between the respective zones in accordance with the definitions.

In another preferred embodiment of the present invention, the method further comprise the enforcing comprises selecting at least one of:

not allowing the creation of copies of documents of the first class within the second restricted zone;

monitoring the exits of the first restricted zone utilizing marking detection;

monitoring the exits of the second restricted zone utilizing marking detection;

monitoring the entrances of the second restricted zone utilizing marking detection devices; and monitoring the entrances of the third not restricted zone utilizing marking detection.

In another preferred embodiment of the present invention, the method further comprise the marking comprises indication about at least one of the following:

distribution policy related information for an associated document;

distribution policy related information;

reference to a database;

reference to a database comprising distribution policy related information for an associated document;

reference to a database comprising distribution policy related information; and an identification of an associated document.

In another preferred embodiment of the present invention, the method further comprise the marking comprise indication about at least one of the following:

information about the contents of an associated document;

Allowed recipients information for an associated document page number information for the page of a copy of an associated document;

copy number information for a copy of an associated document;

copy identification information for a copy of an associated document;

author identity information for an associated document;

managing personnel identity, information for an associated document;

classification level information for an associated document;

printing permission information for an associated document;

copying permission information for an associated document;

removal from restricted zone permission information for an associated document;

usage restriction information for an associated document; and

Access control information for an associated document.

In another preferred embodiment of the present invention, the method further comprise embedding marking detection functionality into at least one of the following devices:

a portable media writing device;

an optical portable media writing device;

a magnetic portable media writing device;

a CD writer;

a DVD writer;

a diskette drive;

a magnetic tape writer;

a zip disk drive;

a flash memory card writing device;

a portable storage device interface;

a USB interface;

a bluetooth interface;

a firewire interface;

a IDE interface;

a SCSI interface;

a TCP/IP interface;

a infrared interface;

a wireless interface; and a RF interface.

In another preferred embodiment of the present invention, the method further comprise embedding marking detection functionality into at least one of the following devices.

a scanning device;

a scanner;

a printing device;

a printer;

a plotter;

a copying device;

a photocopier;

a fax machine;

a document destruction device; and a shredder.

In another preferred embodiment of the present invention, the method further comprise embedding the marking detection functionality into a document destruction device, thereby to enable the distribution policy enforcement facilitation module to monitor at least one of the following:

The number of copies of the document that have been created and not destroyed;

The number of copies of the document that have been created and destroyed;

The identity of copies of the document that have been created and not destroyed;

The identity of copies of the document that have been created and destroyed;

The identity of pages of copies of the document that have been created and not destroyed;

The identity of pages of copies of the document that were created and destroyed;

The identity of sections of copies of the document that have been created and not destroyed; and The identity of sections of copies of the document that have been created and destroyed.

In another preferred embodiment of the present invention, the method further comprise embedding the marking detection functionality into a document destruction device, thereby to enable the distribution policy enforcement facilitation module to monitor at least one of the following:

identities of persons possessing copies of the documents that have been created and not destroyed;

identities of persons possessing copies of the document that have been created and not destroyed;

identities of persons possessing pages of copies of the documents which have been created and not destroyed;

identities of persons possessing sections of copies of the documents which have been created and not destroyed;

identities of persons possessing copies of the documents that have been created and not destroyed, the identity being discerned by utilizing a personnel identification device;

identities of persons possessing copies of the documents that have been created and not destroyed, the identity being discernable by utilizing a personnel identification device;

identities of persons possessing pages of copies of the documents that have been created and not destroyed, the identity being discernable by utilizing a personnel identification device; and identities of persons possessing sections of copies of the documents that have been created and not destroyed, the identity being discernable by utilizing a personnel identification device.

In another preferred embodiment of the present invention, the method further comprise the output form of the document comprises at least one of one of the following:

A printed copy of the document;

A digital copy of the document;

A copy of the document stored on portable media;

A copy of the document stored on portable storage device;

A copy of the document stored an optical portable media;

A copy of the document stored on a magnetic portable media;

A copy of the document stored an optical media;

A copy of the document stored on a magnetic media;

A copy of the document stored on a CD;

A copy of the document stored on a DVD;

A copy of the document stored on a diskette;

A copy of the document stored on a magnetic tape;

A copy of the document stored on a zip disk; and

A copy of the document stored on a flash memory card.

In another preferred embodiment of the present invention, the method further comprise the distribution policy comprises a retention policy.

According to a fourth aspect of the present invention there is provided a system for enforcing a distribution policy associated with an electronic document comprising:

An output device operable to produce an output form of the electronic document;

A policy reference component operable to determine a distribution policy for the document;

A marking module operable to embed a marking indicating at least the existence of the distribution policy on an output form of the electronic document produced by the output device, the marking being readable to enforce the associated marking policy, the policy reference component operable to instruct the marking module.

In another preferred embodiment of the present invention, the system further comprise the marking comprise at least one of the following:

An arrangement embedded into the output that can be detected using electromagnetic means;

A radio frequency remote identification device;

An electronic circuit;

An electronic resonant circuit;

An electronic resonant circuit comprising a capacitor and a coil;

Matched dipole antenna;

radiation emitting material;

Magnetic substance;

Antenna;

Microwave detectable component;

Excite-able quantum system;

Piezoelectric component; and

Acoustic resonator.

In another preferred embodiment of the present invention, the system further comprise the output comprises printed paper, and the marking comprises at least one of the following:

An apparatus embedded in the paper;

Conductive ink;

A Printable electronic component;

Magnetic ink;

A Conductive segment;

detectable chemicals;

Barcode; and

Visible marking.

In another preferred embodiment of the present invention, the system further comprise the marking comprise at least one of the following:

Marking which is not substantially visually perceptible;

Marking which is not substantially visually discernable from a background;

a marking comprising a plurality of layers;

a plurality of markings;

a plurality of layers of markings, each layer comprising different information;

a plurality of markings, each comprising different information;

a plurality of different markings each layer comprising a different marking technique;

a plurality of layers of markings each layer comprising several different marking techniques;

Marking which is substantially difficult to remove;

Marking which is difficult to substantially damage;

Marking operable to be localized; and

Marking operable to be localized by triangulation.

In another preferred embodiment of the present invention, the system further comprise:

A marking detection device operable to detect marking embedded in the output;

A distribution policy enforcement facilitation module, the marking detection device is operable to notify the distribution policy enforcement facilitation module about detection of the marking, and the distribution policy enforcement facilitation module is operable to perform a policy enforcement action according to the notification.

In another preferred embodiment of the present invention, the system further comprise the policy enforcement action comprising at least one of the following;

Logging the notification;

Reporting the notification;

Logging and reporting the notification;

Providing an alert;

Sounding an alarm;

Obstructing the exit of the document from a restricted area;

Obstructing the exit of the document from a restricted area by closing an exit;

Preventing a copying device from copying the document;

Preventing a writing device from writing the document to digital media;

Preventing a writing device from writing the document on unmarked digital media;

Preventing a copying device from making an unmarked copy of the detected marked document; and Causing a copying device to embed marking on copies it creates following the detection.

In another preferred embodiment of the present invention, the system further comprise the marking comprises indication about at least one of the following:

distribution policy related information for an associated document;

distribution policy related information;

reference to a database;

reference to a database comprising distribution policy related information for an associated document;

reference to a database comprising distribution policy related information; and an identification of an associated document.

In another preferred embodiment of the present invention, the system further comprise the marking comprise indication about at least one of the following:

information about the contents of an associated document;

Allowed recipients information for an associated document page number information for the page of a copy of an associated document;

copy number information for a copy of an associated document;

copy identification information for a copy of an associated document;

author identity information for an associated document;

managing personnel identity, information for an associated document;

classification level information for an associated document;

printing permission information for an associated document;

copying permission information for an associated document;

removal from restricted zone permission information for an associated document;

usage restriction information for an associated document; and

Access control information for an associated document.

In another preferred embodiment of the present invention, the system further comprise a marking detection device embedded into at least one of the following devices:

a portable media writing device;

an optical portable media writing device;

a magnetic portable media writing device;

a CD writer;

a DVD writer;

a diskette drive;

a magnetic tape writer;

a zip disk drive;

a flash memory card writing device;

a portable storage device interface;

a USB interface;

a bluetooth interface;

a firewire interface;

a IDE interface;

a SCSI interface;

a TCP/IP interface;

a infrared interface;

a wireless interface; and a RF interface.

In another preferred embodiment of the present invention, the system further comprise a marking detection device embedded into at least one of the following devices:

a scanning device;

a scanner;

a printing device;

a printer;

a plotter;

a copying device;

a photocopier;

a fax machine;

a document destruction device; and a shredder.

In another preferred embodiment of the present invention, the system further comprise a marking detection device embedded into a document destruction device, operable to enable the distribution policy enforcement facilitation module to monitor at least one of the following:

The number of copies of the document that have been created and not destroyed;

The number of copies of the document that have been created and destroyed;

The identity of copies of the document that have been created and not destroyed;

The identity of copies of the document that have been created and destroyed;

The identity of pages of copies of the document that have been created and not destroyed;

The identity of pages of copies of the document that were created and destroyed;

The identity of sections of copies of the document that have been created and not destroyed; and The identity of sections of copies of the document that have been created and destroyed.

In another preferred embodiment of the present invention, the system further comprise a marking detection device embedded into a document destruction device, operable to enable the distribution policy enforcement facilitation module to monitor at least one of the following:

identities of persons possessing copies of the documents that have been created and not destroyed;

identities of persons possessing copies of the document that have been created and not destroyed;

identities of persons possessing pages of copies of the documents which have been created and not destroyed;

identities of persons possessing sections of copies of the documents which have been created and not destroyed;

identities of persons possessing copies of the documents that have been created and not destroyed, the identity being discerned by utilizing a personnel identification device;

identities of persons possessing copies of the documents that have been created and not destroyed, the identity being discernable by utilizing a personnel identification device;

identities of persons possessing pages of copies of the documents that have been created and not destroyed, the identity being discernable by utilizing a personnel identification device; and identities of persons possessing sections of copies of the documents that have been created and not destroyed, the identity being discernable by utilizing a personnel identification device.

In another preferred embodiment of the present invention, the system further comprise the output form of the document comprises at least one of one of the following:

A printed copy of the document;

A digital copy of the document;

A copy of the document stored on portable media;

A copy of the document stored on portable storage device;

A copy of the document stored an optical portable media;

A copy of the document stored on a magnetic portable media;

A copy of the document stored an optical media;

A copy of the document stored on a magnetic media;

A copy of the document stored on a CD;

A copy of the document stored on a DVD;

A copy of the document stored on a diskette;

A copy of the document stored on a magnetic tape;

A copy of the document stored on a zip disk; and

A copy of the document stored on a flash memory card.

In another preferred embodiment of the present invention, the system further comprise the distribution policy comprises a retention policy.

According to a fifth aspect of the present invention there is provided a system for enforcing a distribution policy associated with an electronic document comprising:

A marking decoding device operable to detect distribution policy related information embedded in the document based on the distribution policy related information embedded in the document;

A policy reference component operable to determine a distribution policy for the document;

A distribution policy enforcement facilitation module operable to perform an action according to the distribution policy.

In another preferred embodiment of the present invention, the system further comprise the marking comprise at least one of the following:

An arrangement embedded into the output that can be detected using electromagnetic means;

A radio frequency remote identification device;

An electronic circuit;

An electronic resonant circuit;

An electronic resonant circuit comprising a capacitor and a coil;

Matched dipole antenna;

radiation emitting material;

Magnetic substance;

Antenna;

Microwave detectable component;

Excite-able quantum system;

Piezoelectric component; and

Acoustic resonator.

In another preferred embodiment of the present invention, the system further comprise the document comprises printed paper, and the marking comprises at least one of the following:

An apparatus embedded in the paper;

Conductive ink;

A Printable electronic component;

Magnetic ink;

A Conductive segment;

detectable chemicals;

Barcode; and

Visible marking.

In another preferred embodiment of the present invention, the system further comprise the marking comprise at least one of the following:

Marking which is not substantially visually perceptible;

Marking which is not substantially visually discernable from a background;

a marking comprising a plurality of layers;

a plurality of markings;

a plurality of layers of markings, each layer comprising different information;

a plurality of markings, each comprising different information;

a plurality of different markings each layer comprising a different marking technique;

a plurality of layers of markings each layer comprising several different marking techniques;

Marking which is substantially difficult to remove;

Marking which is difficult to substantially damage;

Marking operable to be localized; and

Marking operable to be localized by triangulation.

In another preferred embodiment of the present invention, the system further comprise the action comprising at least one of the following;

Logging;

Reporting;

Logging and reporting;

Providing an alert;

Sounding an alarm;

Obstructing the exit of the document from a restricted area;

Obstructing the exit of the document from a restricted area by closing an exit;

Preventing a copying device from copying the document;

Preventing a writing device from writing the document to digital media;

Preventing a writing device from writing the document on unmarked digital media;

Preventing a copying device from making an unmarked copy of the detected marked document; and Causing a copying device to embed marking on copies it creates following the detection.

In another preferred embodiment of the present invention, the system further comprise the marking comprises indication about at least one of the following:

distribution policy related information for an associated document;

distribution policy related information;

reference to a database;

reference to a database comprising distribution policy related information for an associated document;

reference to a database comprising distribution policy related information; and an identification of an associated document.

In another preferred embodiment of the present invention, the system further comprise the marking comprise indication about at least one of the following:

information about the contents of an associated document;

Allowed recipients information for an associated document page number information for the page of a copy of an associated document;

copy number information for a copy of an associated document;

copy identification information for a copy of an associated document;

author identity information for an associated document;

managing personnel identity, information for an associated document;

classification level information for an associated document;

printing permission information for an associated document;

copying permission information for an associated document;

removal from restricted zone permission information for an associated document;

usage restriction information for an associated document; and

Access control information for an associated document.

In another preferred embodiment of the present invention, the system further comprise a marking detection device embedded into at least one of the following devices:

a portable media writing device;

an optical portable media writing device;

a magnetic portable media writing device;

a CD writer;

a DVD writer;

a diskette drive;

a magnetic tape writer;

a zip disk drive;

a flash memory card writing device;

a portable storage device interface;

a USB interface;

a bluetooth interface;

a firewire interface;

a IDE interface;

a SCSI interface;

a TCP/IP interface;

a infrared interface;

a wireless interface; and a RF interface.

In another preferred embodiment of the present invention, the system further comprise a marking detection device embedded into at least one of the following devices:

a scanning device;

a scanner;

a printing device;

a printer;

a plotter;

a copying device;

a photocopier;

a fax machine;

a document destruction device; and a shredder.

In another preferred embodiment of the present invention, the system further comprise a marking detection device embedded into a document destruction device, operable to enable the distribution policy enforcement facilitation module to monitor at least one of the following:

The number of copies of the document that have been created and not destroyed;

The number of copies of the document that have been created and destroyed;

The identity of copies of the document that have been created and not destroyed;

The identity of copies of the document that have been created and destroyed;

The identity of pages of copies of the document that have been created and not destroyed;

The identity of pages of copies of the document that were created and destroyed;

The identity of sections of copies of the document that have been created and not destroyed; and The identity of sections of copies of the document that have been created and destroyed.

In another preferred embodiment of the present invention, the system further comprise a marking detection device embedded into a document destruction device, operable to enable the distribution policy enforcement facilitation module to monitor at least one of the following:

identities of persons possessing copies of the documents that have been created and not destroyed;

identities of persons possessing copies of the document that have been created and not destroyed;

identities of persons possessing pages of copies of the documents which have been created and not destroyed;

identities of persons possessing sections of copies of the documents which have been created and not destroyed;

identities of persons possessing copies of the documents that have been created and not destroyed, the identity being discerned by utilizing a personnel identification device;

identities of persons possessing copies of the documents that have been created and not destroyed, the identity being discernable by utilizing a personnel identification device;

identities of persons possessing pages of copies of the documents that have been created and not destroyed, the identity being discernable by utilizing a personnel identification device; and identities of persons possessing sections of copies of the documents that have been created and not destroyed, the identity being discernable by utilizing a personnel identification device.

In another preferred embodiment of the present invention, the system further comprise the comprises at least one of one of the following:

A printed copy of the document;

A digital copy of the document;

A copy of the document stored on portable media;

A copy of the document stored on portable storage device;

A copy of the document stored an optical portable media;

A copy of the document stored on a magnetic portable media;

A copy of the document stored an optical media;

A copy of the document stored on a magnetic media;

A copy of the document stored on a CD;

A copy of the document stored on a DVD;

A copy of the document stored on a diskette;

A copy of the document stored on a magnetic tape;

A copy of the document stored on a zip disk; and

A copy of the document stored on a flash memory card.

In another preferred embodiment of the present invention, the system further comprise the distribution policy comprises a retention policy.

BRIEF DESCRIPTION OF THE DRAWINGS

For a better understanding of the invention and to show how the same may be carried into effect, reference will now be made, purely by way of example, to the accompanying drawings, in which.

DETAILED DESCRIPTION OF PREFERRED EMBODIMENTS

Figure 1:
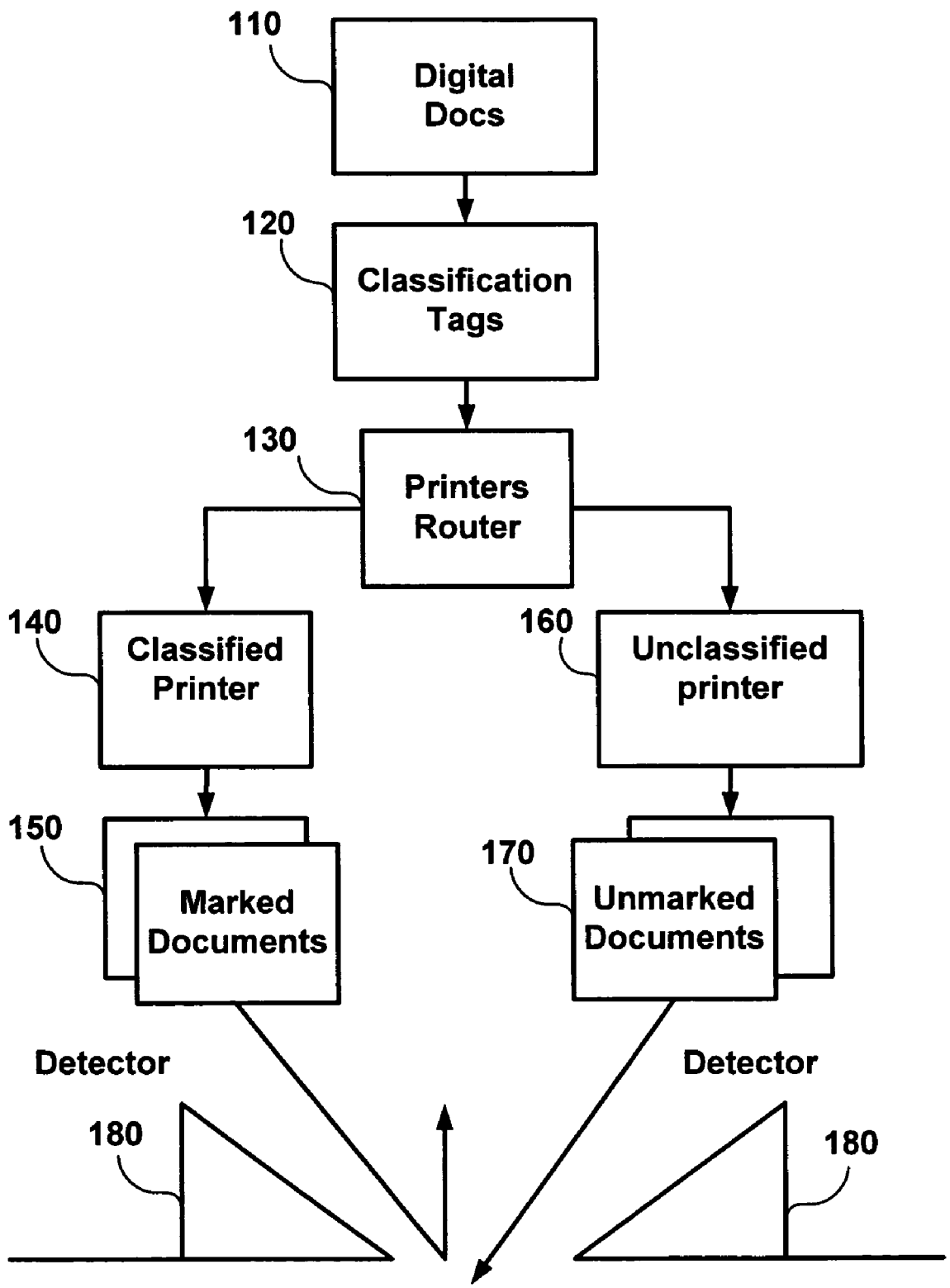
FIG. 1 is a simplified conceptual illustration of a system for detection of unauthorized dissemination of printed and photocopied documents, constructed and operative in accordance with a preferred embodiment of the present invention.

The present invention seeks to provide a method and system for the mitigation of illegal and unauthorized disclosure of printed documents and portable media and for improved enforcement of document retention policy, without otherwise interfering with rightful usage and the privacy of the users. Specifically, the current invention provides methods that allow for detection of unauthorized attempts to disseminate printed documents and portable digital media from restricted zones and to monitor the distraction of information according to an organizational policy.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Reference is firstly made to FIG. 1, which is a simplified illustration showing a conceptual view of a system that allows for detection of unauthorized attempts to move printed documents out of the restricted zone, constructive and operative according to a preferred embodiment of the present invention. Digital documents 110 are provided with classification tags 120, which determine whether they are allowed to be printed by the unclassified printer 150 or only by the classified printer 140. The classified printer 140 prints only marked documents 150, which can thereafter be detected by the detector 180. Upon detection of said unauthorized attempts, the system preferably audits the details and enforces a pre-determined policy, such as closing the exit gate, providing an audible alarm etc. The unclassified printer 160 produces unmarked documents 170, which are allowed to be disseminated outside the restricted zone and are not detected by the detector 180.

In another embodiment of the present invention a single printer, with two modes of operations, classified and unclassified, is used instead of two printers. The printer utilizes two paper trays, one for classified papers and one for unclassified papers, and loads papers from the tray that corresponds to the types of documents that are currently being printed.

In one embodiment of the present invention the two modes of operation of the printer are implemented by using a special type of ink when printing classified documents. In another embodiment, or as an additional safeguard in the same embodiment, the printer may print patterns of a kind that may be identified from a distance, as described below.

In another embodiment of the present invention, the system operates in more then two modes by providing several kinds of detectable marking, which designate several types of required actions (e.g., "Block" "Alert" "Log & Register" "Allow" etc.). In a preferred embodiment of the present invention, the required actions are defined by a policy reference component.

In an embodiment of the present invention, the classification tag 120 is embedded after a descriptor of the to-be printed document is analyzed, in order to determine whether the to-be printed document is classified. The analysis can be performed at the printer server or at the printer itself. A method for such analysis is described in PCT patent application IL02/00037 and U.S. patent application Ser. No. 10/003,269.

Figure 2:
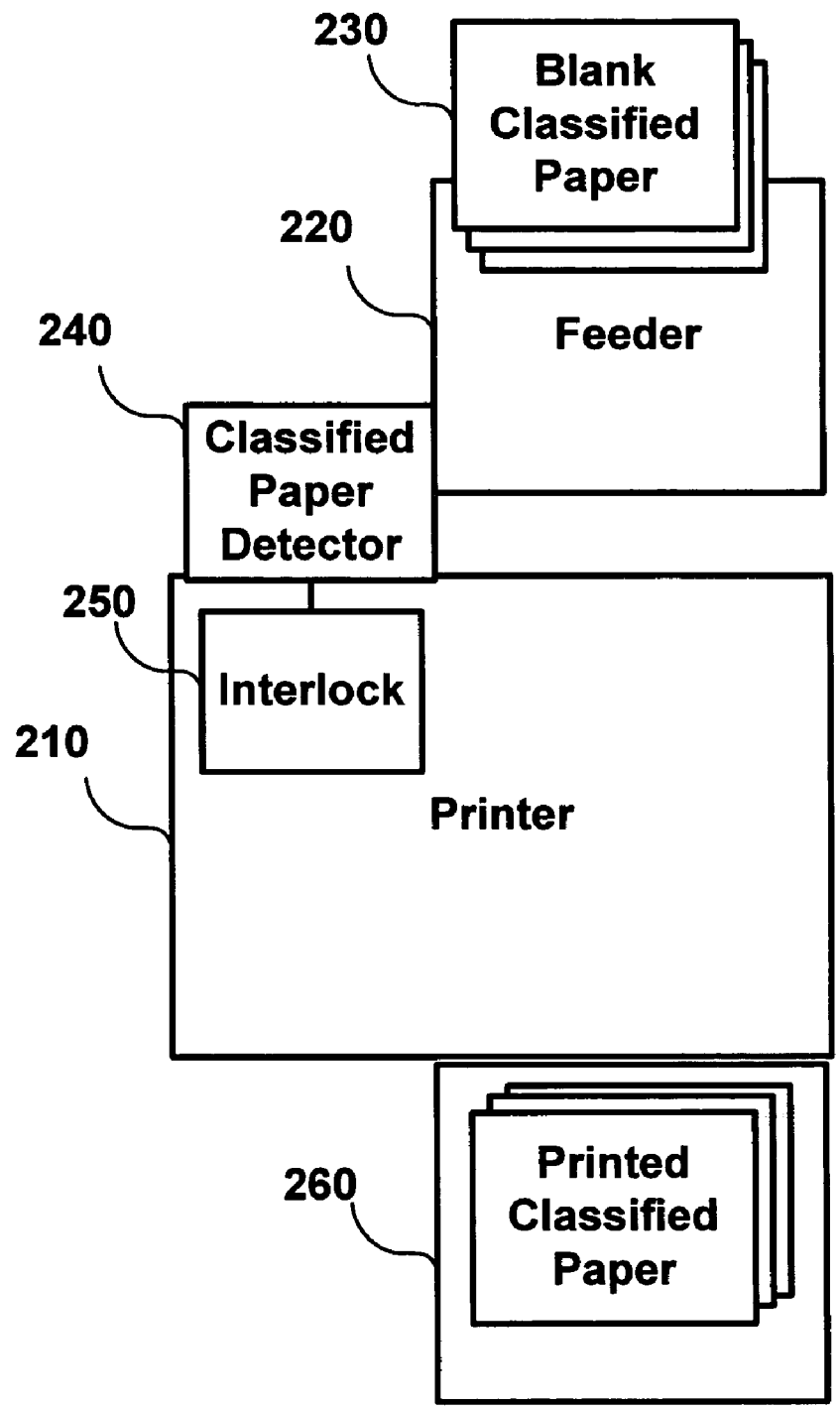
FIG. 2 is a simplified illustration of a part of the embodiment of FIG. 1, for detection of unauthorized dissemination of documents.

Reference is now made to FIG. 2, which is a simplified block diagram showing parts of the system of FIG. 1 in greater detail. FIG. 2 illustrates a preferred embodiment of the classified printer 210: the feeder 220 is loaded with classified papers 230, that contain marks that can be identified from a distance, preferably even if there is no line-of-sight between the paper and the detector. The printer 210 is also equipped with a classified paper detector 240 that is connected to an interlock 250. Only if the detector detects that the fed paper is "classified" or marked as "classified" and identified as classified by a detector, does the interlock permit the printing operation, and printed marked papers are produced. Therefore, printing classified documents on the classified printer can be done only by using classified papers that can thereafter be detected by a remote detector.

In another embodiment of the present invention, physical tamper resistant devices are used in order to ensure that classified documents are printed or photocopied only onto special papers: e.g., the classified papers tray can be locked after it is loaded, and only a trusted person will be able to open the tray.

Figure 3:
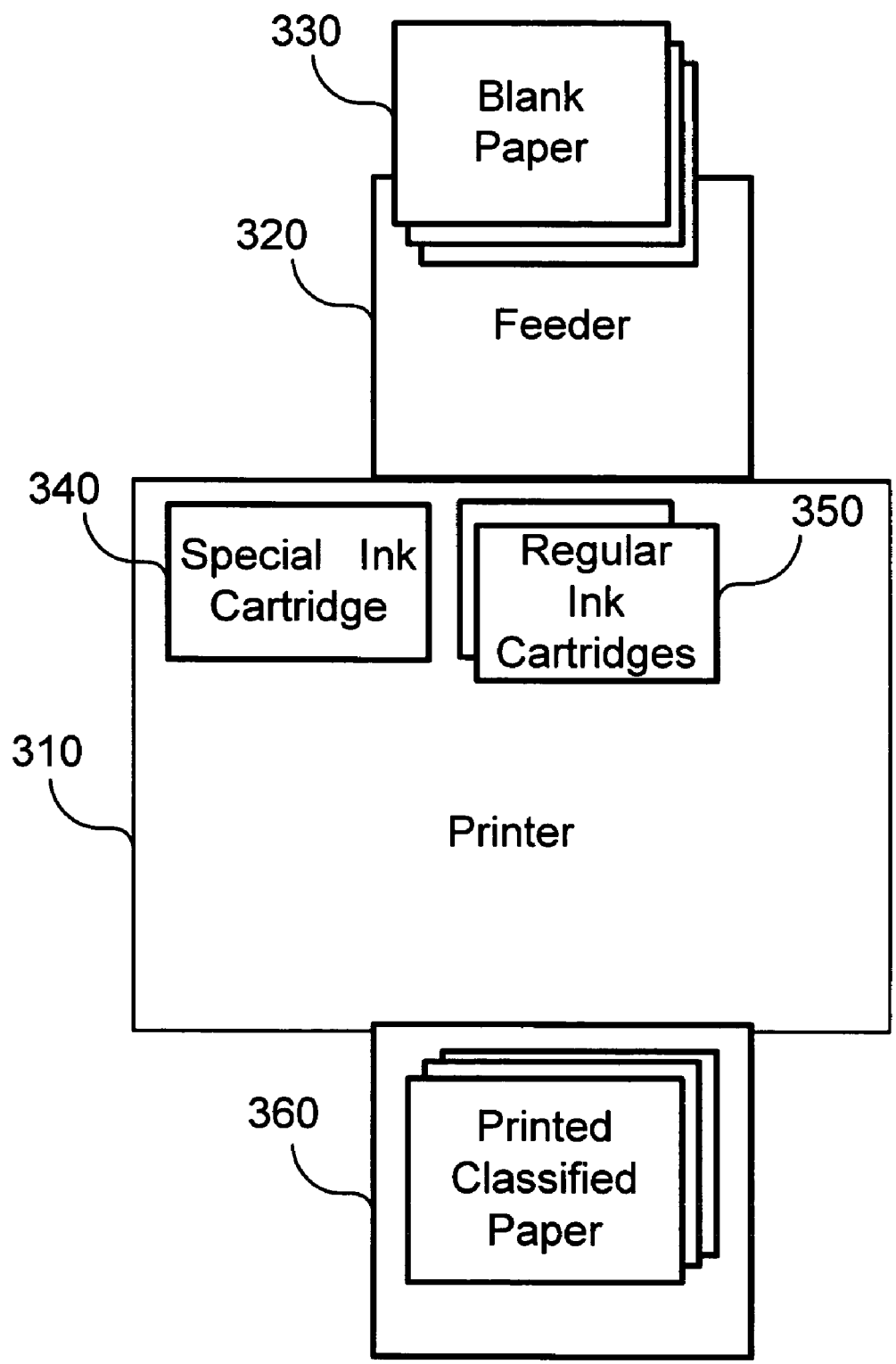
FIG. 3 is a simplified block diagram illustrating another embodiment of the present invention, where the printer uses special ink in order to mark the documents.

Reference is now made to FIG. 3, which is a simplified block diagram illustrating another embodiment of the present invention, where the printer uses special ink in order to mark the documents: the printer 310 is equipped with special ink cartridge 340, as well as regular ink cartridges 350. The feeder 320 is loaded with blank paper 330. When classified papers are being printed, the printer 310 uses the ink from the special ink cartridge 340 in order to print elements that can be detected from a distance (e.g., an electric circuit with a capacitor and a coil (LC), that resonate at a certain electromagnetic frequency). The result is again printed classified papers. The special ink can be, e.g., conductive ink, magnetic ink, radioactive ink or ink that contain special chemicals whose traces can be detected from a distance by a sniffer-detector ("smell detector").

In a preferred embodiment of the present invention, marking comprises at least one of the following:

marking which is not substantially visually perceptible;
marking which is not substantially visually discernable from a background;
a marking comprising a plurality of layers;
a plurality of markings;
a plurality of layers of markings, each layer comprising different information;
a plurality of markings, each comprising different information;
a plurality of different markings each layer comprising a different marking technique;
a plurality of layers of markings each layer comprising several different marking techniques
marking which is substantially difficult to remove;
marking which is difficult to substantially damage;
marking operable to be localized; and
marking operable to be localized by triangulation—i.e., using the intersection of two or more directions, obtained by directional sensors.

In another embodiment of the present invention, the ink is replaced by non-ink elements of a substantially similar function (e.g. gluing a thin LC circuit).

The classification need not be binary: in the two embodiments described above, several levels of classification may be embedded, by using several types of marked papers in the embodiment described in FIG. 2, or by printing several different patterns and/or layers with the special ink in the embodiment described in FIG. 3, such that the changes between the patterns or the paper-types can be detected from a distance. In such cases it may be beneficial if there are several exits to the secured area, only to equip some of those exits with the mechanism to distinguish between the several levels of classification. Marked documents may only be taken out through those exits equipped with the mechanism to distinguish, while the other exits are equipped with means to detect any marks without distinction, and to prevent the passage of any marked documents therethrough e.g. by utilizing an audible or silent alarm, or by closing gates).

The classification mark is preferably embedded in a manner that does not reduce the quality of the printed document, e.g., by using a conductive ink with the color of the background and/or by embedding the marks on the margins and/or by using a substantially transparent ink and/or by printing on the reverse of a one-side printed page or by using a logo or a similarly large connected pattern, possibly using a combination of a conductive and resistant ink of similar colors to produce a image which is not significantly dependant on the underlying conductive pattern.

Figure 4:
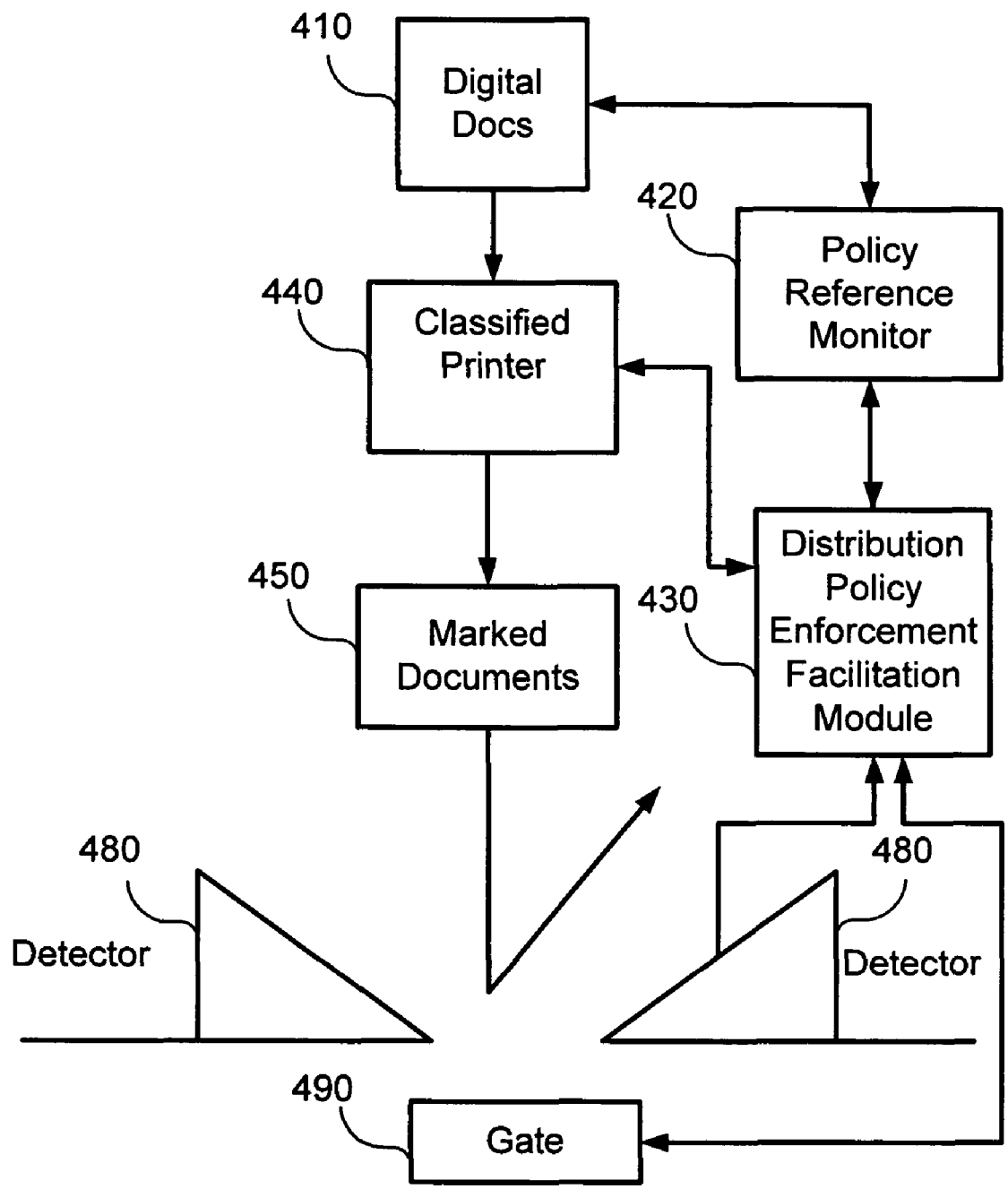
FIG. 4 is a conceptual view of a system, similar to the system depicted in FIG. 1, that only allows printing of classified documents.

Reference is now made to FIG. 4, which is a simplified illustration showing a conceptual view of a system, constructive and operative according to a preferred embodiment of the present invention, that allows printing of classified documents only in a marked form: Digital documents 410, which are designated as "classified" by the policy reference monitor 420, are allowed by the distribution policy enforcement facilitation module 430 to be printed by classified printer 440 that prints marked documents 450, which can thereafter be detected by the detector 480. Upon detection, the detector 480 sends the details of the detection event to the distribution policy enforcement facilitation module 430, which sends the details of the event to the policy reference monitor 420, which determines the required actions and instructs the distribution policy enforcement facilitation module 430 to enforce a predetermined policy, such as closing the exit gate 490, providing an audible alarm etc.

Figure 5:
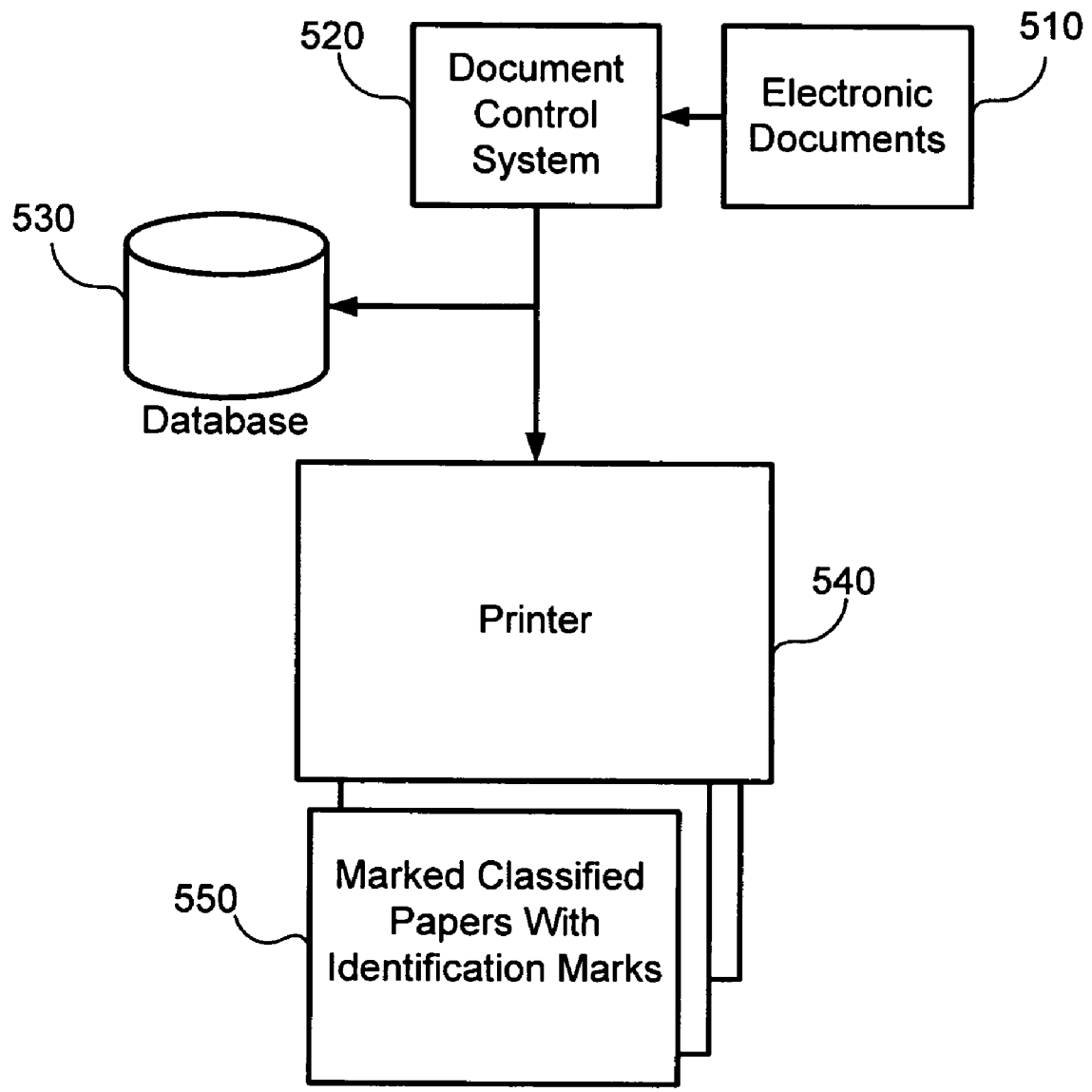
FIG. 5 illustrates another preferred embodiment of the present invention, where each classified paper also contains a unique identification mark.

FIG. 5 illustrates another preferred embodiment of the present invention, where each classified paper also contains a unique identification mark 550 (e.g., a serial number). The identification mark may be pre-printed or otherwise embedded in each classified paper before the printing process or may be printed or otherwise embedded in each classified paper during the printing process. The identifiable mark may be printed or embedded using a regular ink or using a special method that allows it to be identified by a remote sensor, e.g., using a standard electronic article surveillance (AES) system. In one embodiment of the present invention, the system assigns the identification mark, e.g., a number encoded by a barcode, to be printed on the paper and register the identification mark together with the description of the printed papers. Such a description may, for example, comprises one or more of the following details: a page number, copy number, document identification number, author identity, classification level, allowed recipients, usage restriction such as printing permission etc. in a database 530. If the identification mark is inserted before the printing process, then the system may be equipped with a reader that reads the identification mark before or during the printing process, and sends it to the system, where it may then be correlated with the details of the document. In a preferred embodiment of the present invention, database 530 is at least partially integrated into a document management system 520, in a manner that streamlines and integrates the management of the security policy, and in particular ensures that all documents are handled according to the security policy within the limitations of the document management system 520.

In another embodiment of the present invention, the document description information is encoded in the identification mark rather than stored in a database.

In another embodiment of the present invention, at least some of the decisions made by the system use a rule based decision system, preferably in conjunction with the information gathered in a database 530. Thus, for example a rule can dictate that a certain class of documents should enjoy a stricter or more lax security policy, that a certain group of individuals can override a specified subset of the security provisions for a group of documents, that a certain individual should be silently alerted if a certain document is handled in a specific way (either authorized or unauthorized) by a specific person, etc.

Figure 6:
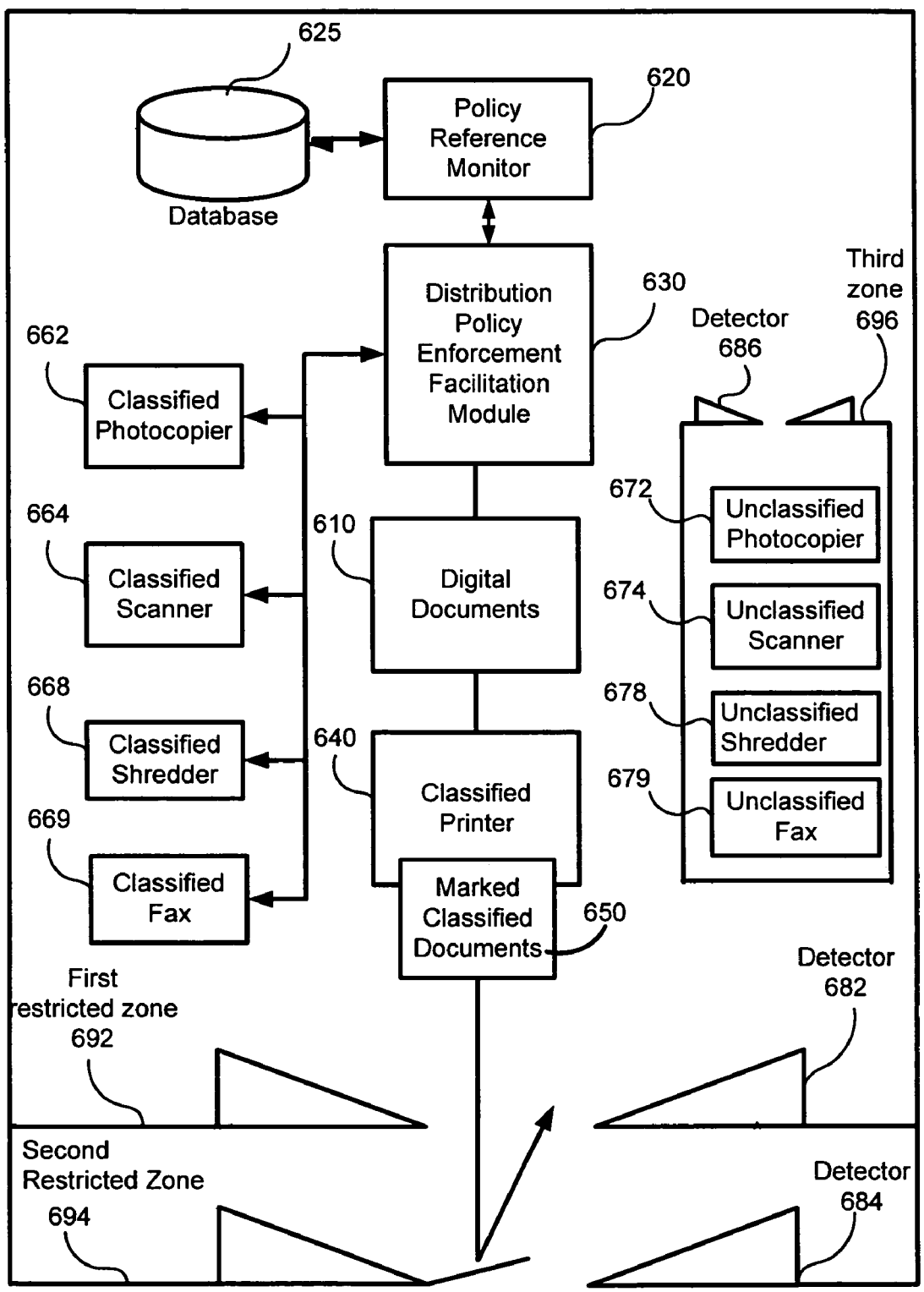
FIG. 6 illustrates a preferred embodiment of the present invention, which shows the relations between the protection system and peripheral equipment such as a photocopier; fax machine; scanner; shredder, etc.

FIG. 6 illustrates another preferred embodiment of the present invention, which shows the relations between the protection system and peripheral equipment such as a photocopier, fax machine, scanner, shredder, etc. The embodiment allows for more then one restricted zone, according to the confidentiality level of the documents. Peripheral devices such as photocopy machines are divided into two kinds: regular photocopying machines 672 that allows photocopying on regular papers, and classified photocopying machines 662, that allow printing only on special detectable paper. The regular photocopying machine 672, scanner 674, shredder 678 and fax machine 679 are restricted to a zone 696, protected by the detector 686, into which classified papers 650 are not allowed, and the entrance to the zone is protected by detectors of classified papers, thereby preventing photocopying of classified documents on regular paper. The classified photocopying machine 662 scanner 664, shredder 668 and fax machine 669 operates only if classified papers are fed into it, thereby assuring that classified documents are copied on classified papers only. In a preferred embodiment of the present invention, the identity of each classified document is embedded in the document (e.g., using a barcode) and the identity of the copied document is checked (e.g., using a barcode reader attached to the machine).

In another embodiment of the present invention, the peripheral equipment that is the photocopier, fax machine, scanner, shredder, etc. are able to recognize the documents in a content-aware manner. For example they may be equipped for optical recognition of the characters in the document (OCR) and analyzing of the textual content of the document. After performing the analysis, characteristics of the content are preferably extracted and compared with a set of document characteristics which resides in the database, in a manner similar to the one described in PCT patent application IL02/00037 and U.S. patent application Ser. No. 10/003,269. Results of the analysis can be used in order to apply a policy using a central decision system, based on pre-defined rules. The central decision system may instruct not to allow the operation (photocopying, scanning, etc.). Results of the analysis and the operation are preferably stored in a database.

In another embodiment of the present invention, the restricted zones are separated into at least two restricted zones: first restricted zone, 692, and second restricted zone 694. Certain kinds of secured documents may be present only in some of those secured zones, or some individuals may only handle certain kinds of documents in a specific way in some of the zones. In this case, the controlling mechanism preferably takes into account (preferably utilizing a rule based decision system) the location of the detector (e.g. in a passage between two restricted zones 682, in an exit or entrance of a secured zone 684) in order to arrive at its decisions, for example block or allow passage, sound an alarm, etc.

Figure 7:
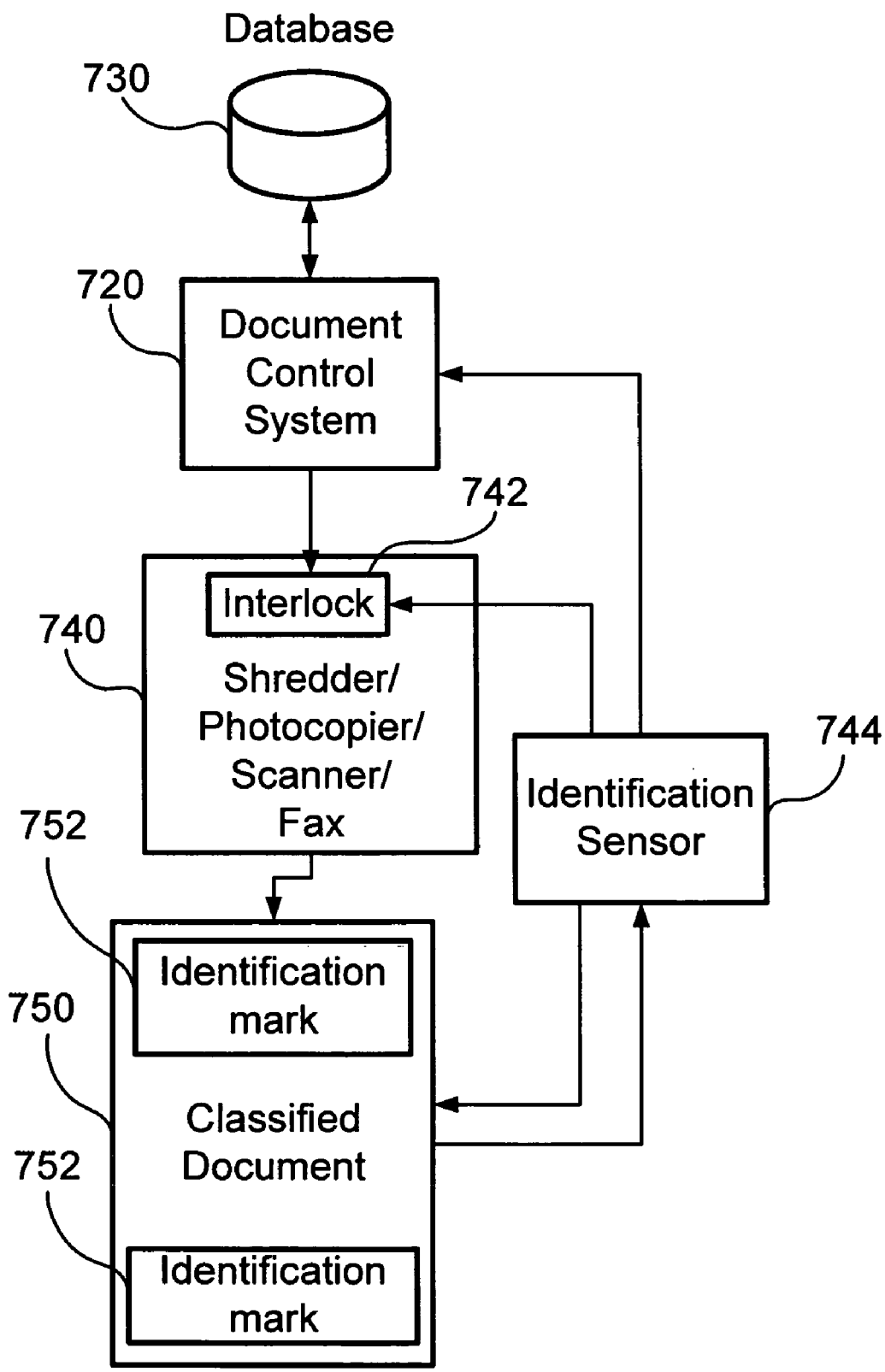
FIG. 7 is a simplified block diagram showing parts of the system of FIG. 6 in greater detail, in accordance with a preferred embodiment of the present invention.

Reference is now made to FIG. 7, which is a simplified block diagram showing parts of the system of FIG. 6 in greater detail, in accordance with a preferred embodiment of the present invention: In the embodiment of FIG. 7, devices 740 that causing changes in the number of available printed copies (beside printers) such as shredders, photocopiers and fax machines, as well as devices that transform the format of printed documents, such as scanners and/or the photocopying machine and/or the scanners are also equipped with a reader or identification sensor 744 operable to read the identification mark 752 embedded in the classified document 754 to determine a document's identity, and the identity of each paper that is entered the devices 740 (e.g., shredded or photocopied) is checked and reported to the document control system 720, which either allow or forbid the device operation utilizing the interlock 742. If the device operation is allowed, the system preferably store the resulted number of copies in the database 730. In a preferred embodiment of the present invention, there is more then one identification mark on each paper, and the paper is reported as shredded only if all the marks were read during the shredding operation so that a reasonable determination can be made that the entire document has been shredded. Keeping tracks of the number of created and districted copies enable to efficiently enforce a document retention policy that complies with the organizational policy. In a preferred embodiment of the present invention the system, with shredders as equipped according to FIG. 7, is connected to a database 730 which records the printing and shredding of each classified page, together with details of the holder of the page. The system thus enables tracking of all existing copies of all pages and helps both to prevent neglecting to shred copies which are no longer needed, and to prevent malicious leaks or retaining of documents.

In another embodiment of the present invention, only some of the pages are so marked, but the mark is substantially imperceptible, preventing removal of the marked pages. Such an imperceptible mark is preferred to prevent damaging or otherwise circumventing the mark. The imperceptible mark can be embedded using watermarking and steganography software, that allow to embed substantially imperceptible messages in pictures and in text Methods for robust embedding of watermarks in text are described in PCT patent application number IL02/00464.

In another embodiment of the present invention, peripheral equipment, such as photocopiers shredders, scanners and fax machines are equipped with personal identifiers, for example a key-pad that only enables usage upon inserting a personal key-number, thereby providing data regarding the identity of the person that photocopied, fax, shredded or scanned a certain document.

Figure 8:
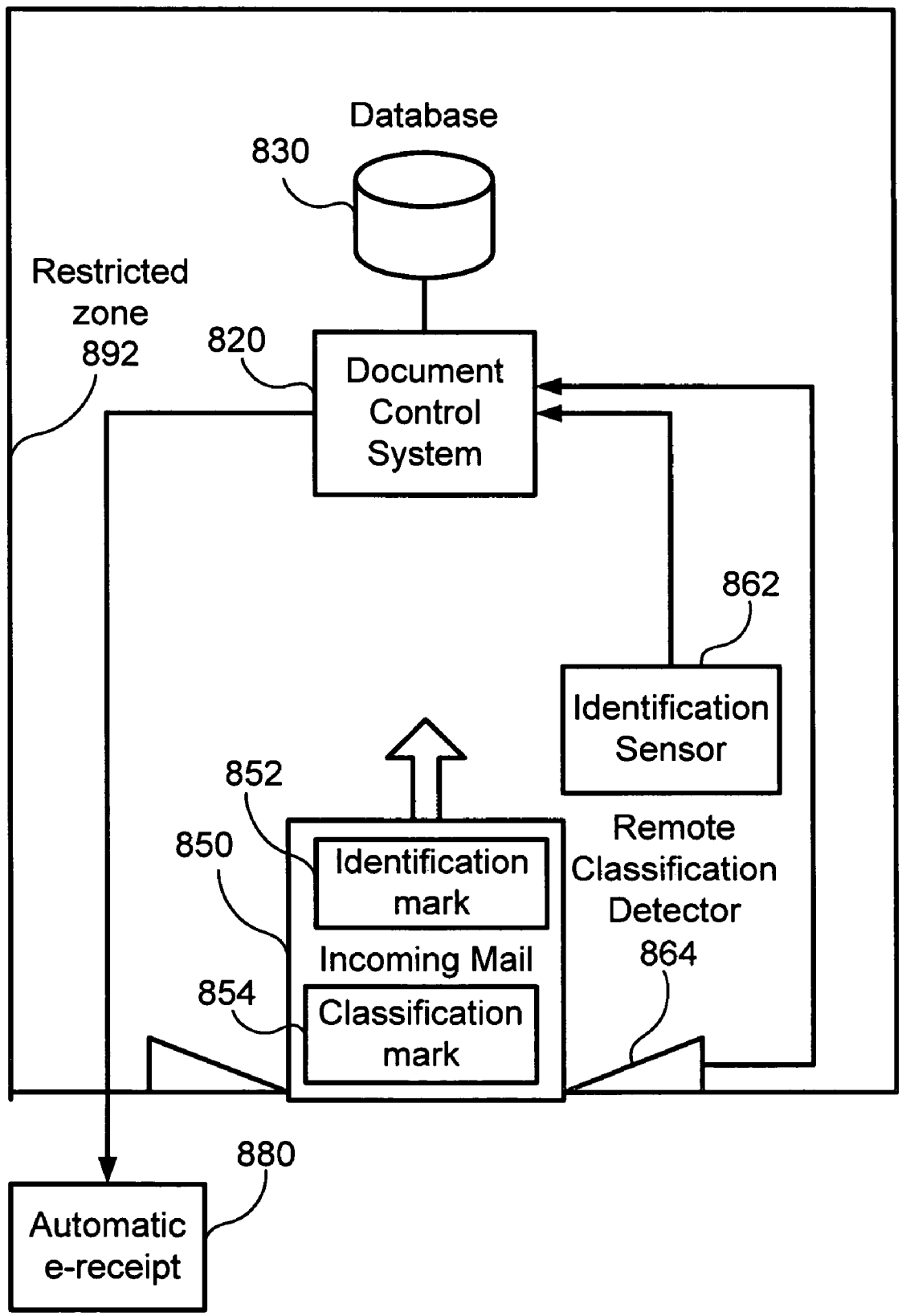
FIG. 8 illustrates a schematic diagram of a system that handle classified documents which are imported from another site in an authorized manner, using a compatible system, according to another preferred embodiment of the present invention.

Turning now to FIG. 8, there is illustrated a schematic diagram of a system that handles classified documents which are imported from another site in an authorized manner, using a compatible system, according to another preferred embodiment of the present invention. Incoming documents 850 are preferably automatically scanned by a remote identification sensor 862 into local document control system 820 and database 830. Typically the identification sensor determines that the incoming document is classified. Classification information of the document is stored in a classification mark 854 and is read by remote classification detector 864 and likewise entered into the local system. The local control system 820 is able to recognize document restriction classifications due to its compatibility with the originating system. Upon registration, an automatic e-receipt 880 is automatically sent to the sender and/or to a monitoring database, such as the originating database. Once entered into the restricted zone, the imported documents are handled in a manner that is similar to the way in which documents that are originated locally are handled.

It will be appreciated that the identity and classification marks can be combined into a single mark, and the identification sensor and classification detector can likewise be combined.

In another preferred embodiment of the present invention, the unauthorized extraction of portable and of potentially portable media is prevented. Potentially portable media can be divided into two kinds of devices: extractable media devices, and quasi-fixed hardware devices. In the present context, extractable media devices are defined as devices that have the capacity for storing information on an extractable media (rather than storing the information internally), e.g., a floppy disk drive, a tape device, a ZIP drive, a recordable CD drive, a flash-memory card writer, etc. In contrast, quasi-fixed hardware devices are defined in this context as devices that have the capacity to store information internally; these include hard disks drives, internal flash-memory cards, etc.

Both kinds of devices need to be protected by either embedding a remotely detectable pattern on the media on which the information is stored. The media may be the extractable media in the case of extractable media devices and the device itself in the case of quasi-fixed hardware devices. The media may physically prevent the extraction of the media, especially in the case of quasi-fixed hardware devices, or may prevent the storage of sensitive information on the unprotected media. In some cases more than one of the methods may be used in conjunction. For example it is possible both to physically secure a hard disk drive and to embed a detectable device in it in case the physical protection is thwarted or the computer case is taken in its entirety without prior extraction of the hard drive carrying the sensitive data.

A preferred method of preventing the storage of sensitive information on unprotected media comprises, in the case of extractable media devices, setting the device (or another device used in conjunction to it, such as an "add-on"), to detect whether the inserted media is protected. Optionally the device may also be set to detect the protection level. In another embodiment of the present invention, several methods, levels, or classes of protection may exist. In a preferred embodiment the classes of protection may be achieved by embedding specific information in the media, which describe whether it is sufficiently or appropriately protected. Thus new classes of protection may be defined on the fly simply by providing different embedded descriptions.

The media device may enforce the protection itself, for example by preventing information storage into the not sufficiently protected media. Alternatively it may pass on the results of detection to another entity, whether software, firmware or hardware that enforces a pre-defined policy by either approving, partly approving or preventing the information storage.

In preferred embodiment of the present invention the software, firmware or hardware entity, which is charged with the enforcing of the policy, is informed prior to any attempt at storage of the information, and is thus able to exercise control over whether such an attempt can be made.

In a preferred embodiment of the present invention, at least one of the following devices comprise at least one of marking detection device comprising embedding marking detection functionality into one of the following devices:
  a portable media writing device;
  an optical portable media writing device;
  a magnetic portable media writing device;
  a CD writer;
  a DVD writer;
  a diskette drive;
  a magnetic tape writer;
  a zip disk drive;
  a flash memory card writing device;
  a portable storage device interface;
  a USB interface;
  a bluetooth interface;
  a firewire interface;
  a IDE interface;
  a SCSI interface;
  a TCP/IP interface;
  a infrared interface;
  a wireless interface; and
  a RF interface.

Figure 9:
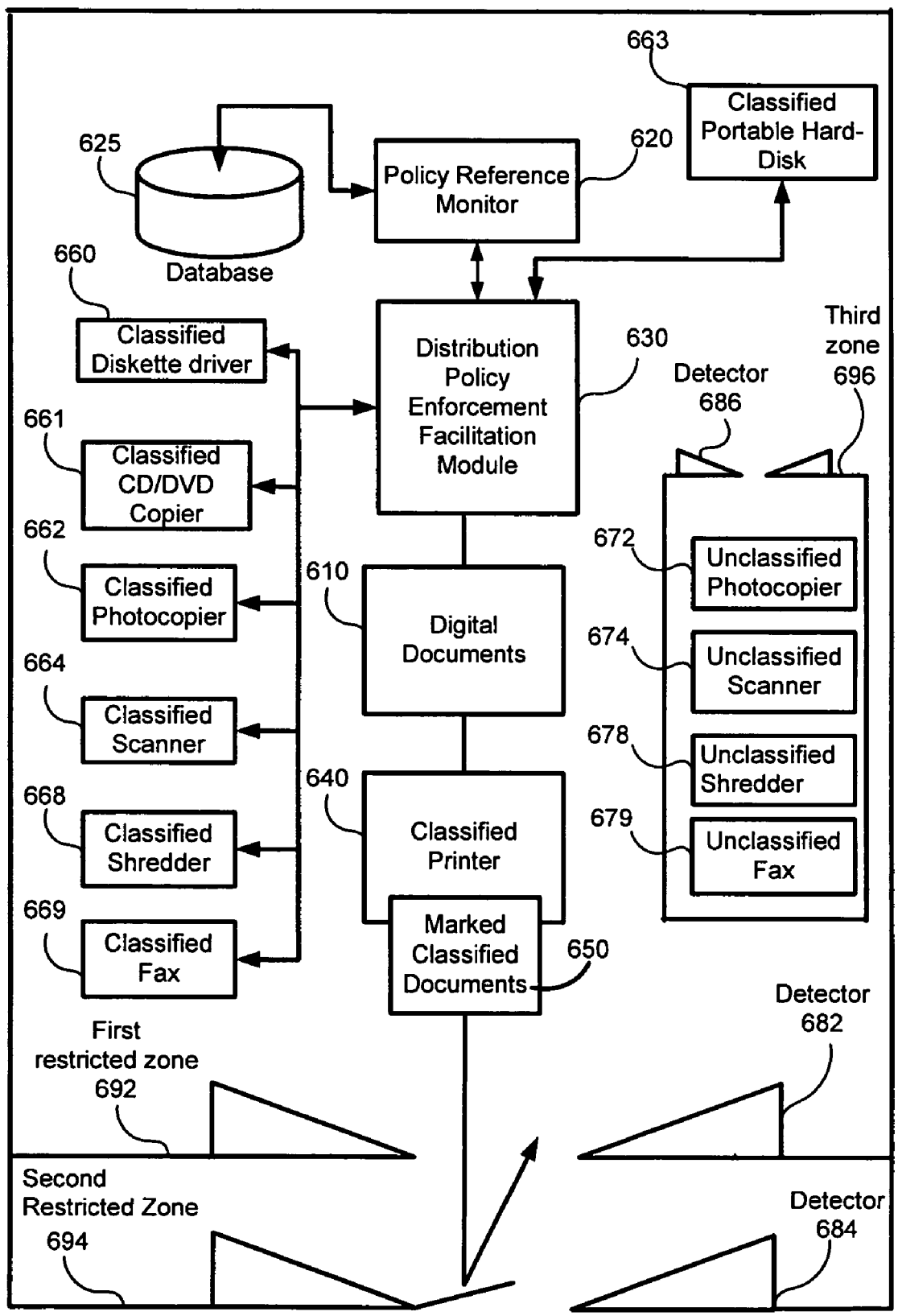
FIG. 9 is a simplified block diagram showing a system, similar to the one described in FIG. 6, which also protects against unauthorized dissemination of portable media.

Reference is now made to FIG. 9, which is a simplified block diagram showing a system, similar to the one described in FIG. 6, which protects against unauthorized dissemination of portable media. Using the system of FIG. 9, the distribution policy enforcement facilitation module 630 requires that, according to a policy dictated by the policy reference monitor 620, writing to a portable media writer, such as diskette writer 660, CD-ROM/DVD writer 661 and portable hard-disc writer 663, may entails marking the media, the disk, tape etc. in a manner that is detectable from a distance by the system detectors. The marking is carried out by the writing devices, which are designated devices able to detect, or be informed, that they are dealing with classified information and are then able to mark the media accordingly, as described above.

In a preferred embodiment of the present invention devices for producing or destruction printed or digital documents can communicate to software, firmware or hardware which is charged with the enforcing of the policy in accordance with their security capabilities. This can be done either as a part of the device's protocols and interfaces (e.g. USB, IDE, SCSI, TCP/IP, etc.), as an extension to the protocol or interface, or in a dedicated protocol and interface. The latter preferably prevents the thwarting of the method by monitoring the synchronization of the security interface with the data interface. In a preferred embodiment of the present invention the interface communication is protected by having the information cryptographically signed and/or preferably encrypted.

Figure 10:
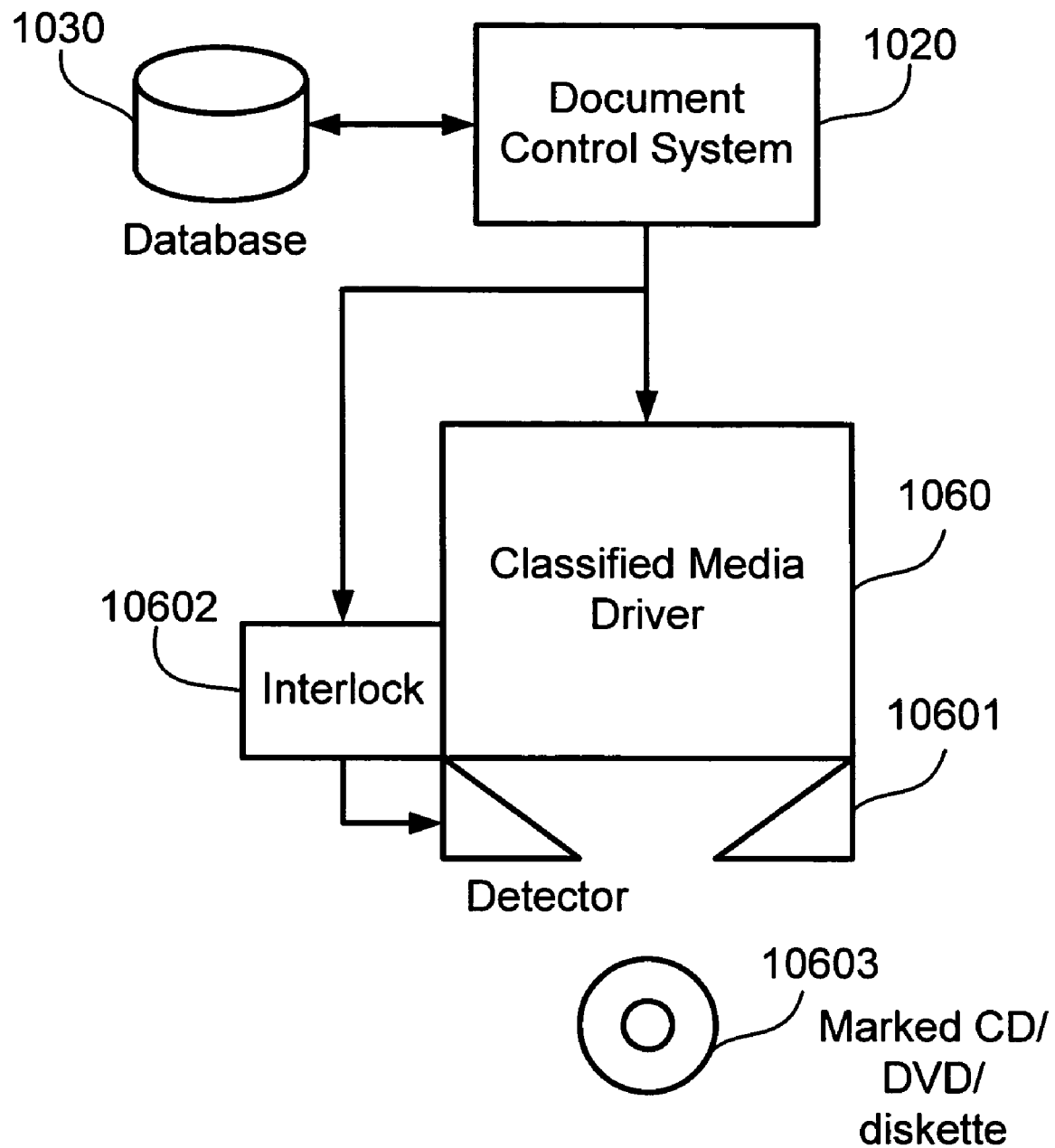
FIG. 10 describes a preferred embodiment of the present invention, where tamper-resistance hardware is used in order to detect whether the portable media is indeed marked, before it insertion thereon of classified material.

Reference is now made to FIG. 10, which is a simplified schematic diagram that describes a preferred embodiment of the present invention, where tamper-resistant hardware is used in order to detect whether portable media is indeed marked, before it allows to write classified material thereon. classified portable media driver 1060 is equipped with a detector 10601 and an interlock 10602. If document control system 1020 indicates that classified content is going to be written on the portable media, then the interlock 10602 allows writing on the media only if the detector 10601 indicates that marked media can be inserted into the portable media drive.

In a preferred embodiment of the present invention the communication is protected.

In a preferred embodiment of the present invention the information is used by a rule based decision system in the software, firmware or hardware which is charged with the enforcing of the policy in order to decide whether to permit the storage of information and possibly to perform other security operations e.g. alert, or documentation in a "log" file. Naturally if no such information were transferred a preferred embodiment would consider the device untrustworthy, and prevent storage of information on it.

The present method can be similarly used with external devices over a network, including other computers.

Remote detection, as described above, can be based on numerous methods and combinations thereof. Some preferred examples are given below.

Figure 11:
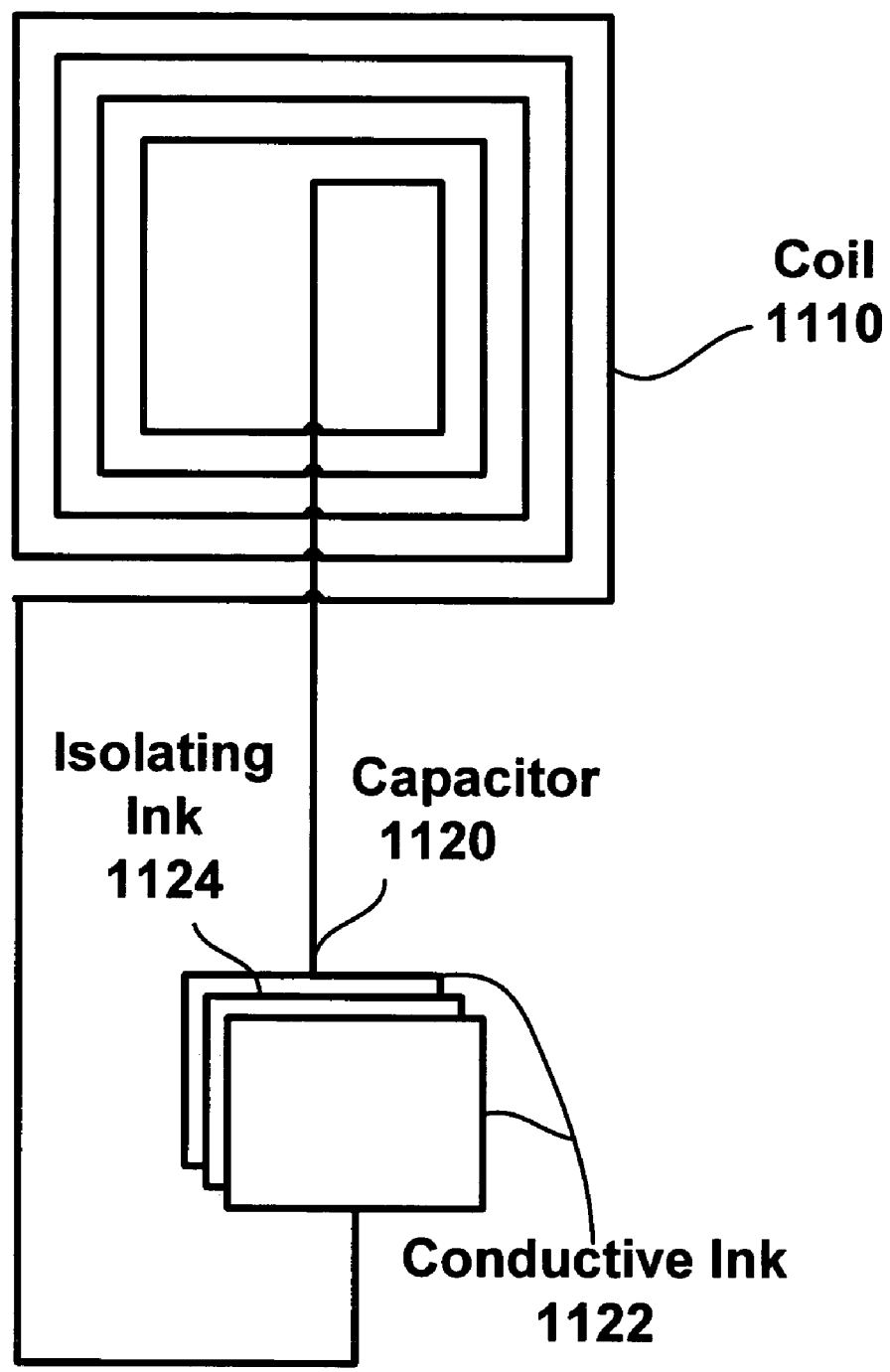
FIG. 11 illustrates an electric circuit that contains a coil and a capacitor (an LC circuit) that can be printed on conductive papers and isolating inks.

RF detection: an electric circuit that contains a coil and a capacitor (an LC circuit) may be embedded within each paper, e.g., using conductive ink. FIG. 11 illustrates such a circuit: an impedance element (coil) 1110 is constructed by printing a spiral using a conductive ink. The capacitor 1120 is constructed by printing a conductive area 1122, printing on it an isolating area using insulating ink, 1124 and then printing on it another conductive area 1122. The detection is based on sending short pulses of electromagnetic waves at the resonant frequency of the LC circuit, thereby exciting the circuit, which keeps oscillating at the resonant frequency and emits electromagnetic waves at that frequency. A receiver measures the radio-frequency (RF) emission received after the time of the pulse, in a manner substantially similar to that used in common anti-theft devices. Another identification method may be based on embedding a radio frequency identification microchip (RFID) (currently used on "smart cards") on "classified papers". The RFID microchips also permit the assigning of a unique ID on each of the documents, thereby providing a wide scope of management utilities. In another embodiment of the present invention several receivers are used in order to localize the documents (e.g., by triangulation) Such may be achieved in many of the other methods illustrated below.

Microwave detection: small antennas are embedded inside the documents (e.g., by drawing lines using conductive ink) The detector sends electromagnetic waves at a wavelength that is a match with the antenna's. The resulting signal may then be measured at the receiver.

Traceable chemical substances: the ink or the paper itself preferably contains volatile chemicals whose traces can be detected from a distance by a sniffer-detector ("odor detector").

Gamma-ray detection: traces of radioactive matter are inserted into the ink or the paper. Detection can be based on counts of a Geiger counter. Radioactive radiation is hard to block, and therefore this method can be used to further enhance detectability. Other kinds of radiation are also possible to detect although most enjoy a lesser degree of penetrability. As an alternative to the direct use of radioactive substances in the document to be protected, it is possible to embed a non-radioactive or only mildly radioactive isotope, and for detection to bombard the embedded isotope with neutrons or other particles. The end result is similar.

Photonic emission: a quantum system (e.g., an atom, a molecule or a solid state device based on semiconductor material) is embedded into the document. The quantum system is excited either thermally, by the ambient temperature, or by absorbing photons from the transmitter, whose energy matches the energy difference between two energy levels or energy bands. The excited system then decays, and emits photons with an energy equal to the energy gap. In another embodiment, the quantum system absorbs more than one photon, and produces a photon whose energy is the sum of the energies of the absorbed photons. This helps to improve the signal-to-noise ratio, since there are no reflected photons in the energy of the emitted photons.

Bimodal detection (acoustic/electromagnetic): miniature piezoelectric crystals surrounded by charges or small magnets (magnetic ink) are embedded into the detectable papers/media. The piezoelectric crystals may be activated acoustically using a certain acoustic frequency. The charged surfaces or magnet oscillate at the excitation frequency, thereby producing electro-magnetic radiation whose frequency is equal to the activation frequency. The fact that the activation is acoustic and the detection is electromagnetic allows for better signal-to-noise ratio then unimodal detection. If an attempt is made to transmit and detect electromagnetic energy at a certain frequency, the attempt would cause reflections and reverberations in the transmitted frequency. Whilst using the embodiment described above, the only source of electromagnetic energy at the excitation frequency would be from the embedded crystals and their charged/magnetic surround.

Acoustic resonators: small crystals, can serve as resonators that are activated by incoming acoustic energy, as indeed can many other objects. Activation of the resonator can be detected either by the sound emitted after the original incoming acoustic energy ceases, by side effects created by utilizing the resulting mechanical energy, for example including creating a secondary resonating frequency, which is not incoming and is easier to detect, this latter can be achieved by linking two resonators or adding a resonance chamber, or by other side effects of the incoming energy.

Figure 12:
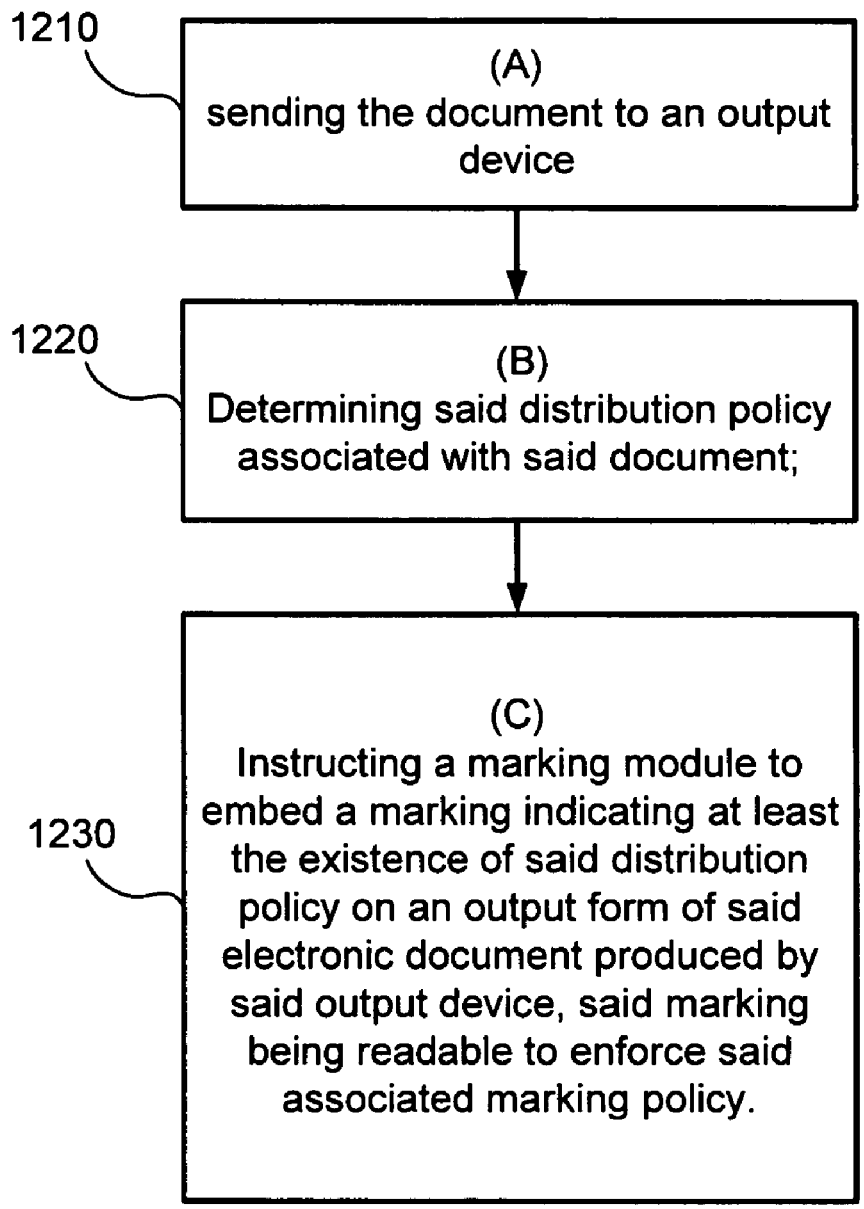
FIG. 12 is a flowchart that describes various stages that comprises a method for enforcing a distribution policy associated with an electronic document, operative according to a preferred embodiment of the present invention.

Reference is now made to FIG. 12, which is a flowchart that describes various stages that comprises a method for enforcing a distribution policy associated with an electronic document, operative according to a preferred embodiment of the present invention. As illustrated therein, the document is first to an output device. (stage A, indicated by 1210). The distribution policy associated with said document is then determined (stage B, indicated by 1220). The marking module is then instructed to embed a marking indicating at least the existence of said distribution policy on an output form of said electronic document produced by said output device, said marking being readable to enforce said associated marking policy (stage C, indicated by 1230).

It is appreciated that one or more steps of any of the methods described herein may be implemented in a different order than that shown, while not departing from the spirit and scope of the invention.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

A number of features have been shown in various combinations in the above embodiments. The skilled person will appreciate that the above combinations are not exhaustive, and all reasonable combinations of the above features are hereby included in the present disclosure.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

The invention claimed is:

1. A method for enforcing a distribution policy associated with an electronic document comprising the steps of:
   sending the electronic document to an output device;
   determining which one of a plurality of distribution policies is associated with said electronic document that is sent;
   instructing a marking module to embed a marking indicating at least the existence of said associated distribution policy on an output form of said electronic document produced by said output device, said embedded marking being readable to enforce said associated distribution policy as indicated by said marking;
   detecting marking embedded in said output using a marking detection technique;
   notifying at least one distribution policy enforcement facilitation module of the detection of said marking; and
   performing a policy enforcement action on said output form according to said notification.

2. A method according to claim 1, wherein said marking comprises at least one of the following:
   marking which is not substantially visually perceptible;
   marking which is not substantially visually discernable from a background;
   a marking comprising a plurality of layers;
   a plurality of markings;
   a plurality of layers of markings, each layer comprising different information;
   a plurality of markings, each comprising different information;
   a plurality of different markings each layer comprising a different marking technique;
   a plurality of layers of markings each layer comprising several different marking techniques;
   marking which is substantially difficult to remove;
   marking which is difficult to substantially damage;
   marking operable to be localized; and
   marking operable to be localized by triangulation.

3. A method according to claim 1, wherein said marking comprise at least one of the following:
   an arrangement embedded into said output that can be detected using electromagnetic means;
   a radio frequency remote identification device;
   an electronic circuit;
   an electronic resonant circuit;
   an electronic resonant circuit comprising a capacitor and a coil;
   matched dipole antenna;
   radiation emitting material;
   magnetic substance;
   antenna;
   microwave detectable component;
   excite-able quantum system;
   piezoelectric component; and
   acoustic resonator.

4. A method according to claim 1, wherein said output comprises printing on paper, and said marking comprises at least one of the following:
   an apparatus embedded in said paper;
   conductive ink;
   a printable electronic component;
   magnetic ink;
   a conductive segment;
   detectable chemicals;
   barcode; and
   visible marking.

5. A method according to claim 1, wherein said policy enforcement action comprising at least one of the following;
   logging said notification;
   reporting said notification;
   logging and reporting said notification;
   providing an alert;
   sounding an alarm;
   obstructing the exit of said document from a restricted area;
   obstructing the exit of said document from a restricted area by closing an exit;
   preventing a copying device from copying said document;
   preventing a writing device from writing said document to digital media;
   preventing a writing device from writing said document on unmarked digital media;
   preventing a copying device from making an unmarked copy of said detected marked document; and
   causing a copying device to embed marking on copies it creates following said detection.

6. A method according to claim 1, further comprising utilizing at least one of the following techniques:
   tamper resistance for marks placed on said output;
   tamper detection for marks placed on said output, said tamper detection for detecting attempts at tampering;
   tamper resistance for a device used for detection of said marks;
   tamper detection for a device used for detection of said mark, said tamper detection for detecting attempts at tampering;
   tamper resistance for a device used for enforcement of said policy;
   tamper detection for a device used for enforcement of said policy, said tamper detection for detecting attempts at tampering;
   cryptography within said marking;
   cryptography for communication with output devices;
   encryption of marks;
   encryption of communication with output devices;
   encryption of communications concerning said distribution policy;
   utilizing a rule based distribution policy to derive a policy for a given document;
   rule based policy analyzing;
   utilizing a document management system for control of distribution policy over a plurality of documents;
   integration with a document management system;
   importing of documents;
   enforcing a document retention policy;
   access control;
   utilizing a personnel identification device operable to identify personnel in association with said documents;
   utilizing a personnel identification device operable to identify personnel attempting to perform an action related to said document;
   access control to at least one storage device;
   access control to at least one storage device for enforcement by said storage device;
   utilizing Optical Character Recognition to analyze the contents of documents in output form;
   utilizing Optical Character Recognition to analyze the contents of marks embedded within documents in output form;
   Inserting marks in the form of bar codes and utilizing bar code reading to identify said marks;
   utilizing tamper resistant hardware; and
   triangulation for position location.

7. A method according to claim 1, further comprising defining at least two zones, such that a document is allowed to be in a first restricted zone, and is not allowed to be in a second, non-restricted, zone, and wherein said enforcing comprises actions preventing transfer of said output form from said first zone to said second zone.

8. A method according to claim 7, wherein said enforcing comprises selecting at least one of the following
   not allowing the creation of copies of said documents within said second zone;
   monitoring exits of said first zone utilizing marking detection; and
   monitoring the entrances of said second zone utilizing marking detection.

9. A method according to claim 1, further comprising
   defining at least two classes of documents,
   providing each class with a mark allowing said class to be distinguished,
   applying a different distribution policy for each class,
   defining at least three zones,
   defining that a first of said classes is allowed to be in a first restricted zone,
   defining that said first class is not allowed to be in a second restricted zone,
   defining that a second of said classes is allowed to be in said first restricted zone,
   defining that said second class is allowed to be in said second restricted zone,
   defining that said second class is not allowed to be in a third non-restricted zone,
   defining that said first class is not allowed to be in said third not restricted zone, and
   wherein said enforcing comprises actions controlling transfer of said output form between said respective zones in accordance with said definitions.

10. A method according to claim 9, wherein said enforcing comprises selecting at least one of:
    not allowing the creation of copies of documents of said first class within said second restricted zone;
    monitoring the exits of said first restricted zone utilizing marking detection;
    monitoring the exits of said second restricted zone utilizing marking detection;
    monitoring the entrances of said second restricted zone utilizing marking detection devices; and
    monitoring the entrances of said third not restricted zone utilizing marking detection.

11. A method according to claim 1, wherein said marking comprises indication about at least one of the following:
    distribution policy related information for an associated document;
    distribution policy related information;
    reference to a database;
    reference to a database comprising distribution policy related information for an associated document;
    reference to a database comprising distribution policy related information; and
    an identification of an associated document.

12. A method according to claim 1, wherein said marking comprise indication about at least one of the following:
    information about the contents of an associated document;
    allowed recipients information for an associated document
    page number information for the page of a copy of an associated document;
    copy number information for a copy of an associated document;
    copy identification information for a copy of an associated document;
    author identity information for an associated document;
    managing personnel identity, information for an associated document;
    classification level information for an associated document;
    printing permission information for an associated document;
    copying permission information for an associated document;
    removal from restricted zone permission information for an associated document;
    usage restriction information for an associated document; and
    access control information for an associated document.

13. A method according to claim 1, further comprising embedding marking detection functionality into at least one of the following devices:
    a portable media writing device;
    an optical portable media writing device;
    a magnetic portable media writing device;
    a CD writer;
    a DVD writer;
    a diskette drive;
    a magnetic tape writer;
    a zip disk drive;
    a flash memory card writing device;
    a portable storage device interface;
    a USB interface;
    a bluetooth interface;
    a firewire interface;
    a IDE interface;
    a SCSI interface;
    a TCP/IP interface;
    a infrared interface;
    a wireless interface; and
    a RF interface.

14. A method according to claim 1, further comprising embedding marking detection functionality into at least one of the following devices:
    a scanning device;
    a scanner;
    a printing device;
    a printer;
    a plotter;
    a copying device;
    a photocopier;
    a fax machine;
    a document destruction device; and
    a shredder.

15. A method according to claim 14, further comprising embedding said marking detection functionality into a document destruction device, thereby to enable said distribution policy enforcement facilitation module to monitor at least one of the following:
    the number of copies of said document that have been created and not destroyed;
    the number of copies of said document that have been created and destroyed;
    the identity of copies of said document that have been created and not destroyed;
    the identity of copies of said document that have been created and destroyed;
    the identity of pages of copies of said document that have been created and not destroyed;

the identity of pages of copies of said document that were created and destroyed;
the identity of sections of copies of said document that have been created and not destroyed; and
the identity of sections of copies of said document that have been created and destroyed.

16. A method according to claim 14, further comprising embedding said marking detection functionality into a document destruction device, thereby to enable said distribution policy enforcement facilitation module to monitor at least one of the following:
identities of persons possessing copies of said documents that have been created and not destroyed;
identities of persons possessing copies of said document that have been created and not destroyed;
identities of persons possessing pages of copies of said documents which have been created and not destroyed;
identities of persons possessing sections of copies of said documents which have been created and not destroyed;
identities of persons possessing copies of said documents that have been created and not destroyed, said identity being discerned by utilizing a personnel identification device;
identities of persons possessing copies of said documents that have been created and not destroyed, said identity being discernable by utilizing a personnel identification device;
identities of persons possessing pages of copies of said documents that have been created and not destroyed, said identity being discernable by utilizing a personnel identification device; and
identities of persons possessing sections of copies of said documents that have been created and not destroyed, said identity being discernable by utilizing a personnel identification device.

17. A method according to claim 1, wherein said output form of said document comprises at least one of one of the following:
a printed copy of said document;
a digital copy of said document;
a copy of said document stored on portable media;
a copy of said document stored on portable storage device;
a copy of said document stored an optical portable media;
a copy of said document stored on a magnetic portable media;
a copy of said document stored an optical media;
a copy of said document stored on a magnetic media;
a copy of said document stored on a CD;
a copy of said document stored on a DVD;
a copy of said document stored on a diskette;
a copy of said document stored on a magnetic tape;
a copy of said document stored on a zip disk; and
a copy of said document stored on a flash memory card.

18. A method according to claim 1, wherein said distribution policy comprises a retention policy.

19. A method for enforcing a distribution policy for documents comprising the steps of:
embedding marking functionality within an electronic document output device, using said output device to produce output of an electronic document in output form;
embedding distribution policy related information for said document on said output form using said marking functionality;
detecting marking embedded in said output using a marking detection technique;
notifying at least one distribution policy enforcement facilitation module of the detection of said marking; and
performing a policy enforcement action regarding said output form according to said notification.

20. A method according to claim 19, wherein said embedding distribution policy related information embedding comprise at least one of the following:
an arrangement embedded into said output that can be detected using electromagnetic means;
a radio frequency remote identification device;
an electronic circuit;
an electronic resonant circuit;
an electronic resonant circuit comprising a capacitor and a coil;
matched dipole antenna;
radiation emitting material;
magnetic substance;
antenna;
microwave detectable component;
excite-able quantum system;
piezoelectric component; and
acoustic resonator.

21. A method according to claim 19, wherein said output comprises printing on paper, and said embedding distribution policy related information embedding comprises at least one of the following:
an apparatus embedded in said paper;
conductive ink;
a printable electronic component;
magnetic ink;
a conductive segment;
detectable chemicals;
barcode; and
visible marking.

22. A method according to claim 19, wherein said embedding distribution policy related information embedding comprise at least one of the following:
marking which is not substantially visually perceptible;
marking which is not substantially visually discernable from a background;
a marking comprising a plurality of layers;
a plurality of markings;
a plurality of layers of markings, each layer comprising different information;
a plurality of markings, each comprising different information;
a plurality of different markings each layer comprising a different marking technique;
a plurality of layers of markings each layer comprising several different marking techniques;
marking which is substantially difficult to remove;
marking which is difficult to substantially damage;
marking operable to be localized; and
marking operable to be localized by triangulation.

23. A method according to claim 19, wherein said policy enforcement action comprising at least one of the following;
logging said notification;
reporting said notification;
logging and reporting said notification;
providing an alert;
sounding an alarm;
obstructing the exit of said document from a restricted area;
obstructing the exit of said document from a restricted area by closing an exit;
preventing a copying device from copying said document;
preventing a writing device from writing said document to digital media;

preventing a writing device from writing said document on unmarked digital media;

preventing a copying device from making an unmarked copy of said detected marked document; and causing a copying device to embed marking on copies it creates following said detection.

24. A method according to claim 19, further comprising utilizing at least one of the following techniques:

tamper resistance for marks placed on said output;

tamper detection for marks placed on said output, said tamper detection for detecting attempts at tampering;

tamper resistance for a device used for detection of said marks;

tamper detection for a device used for detection of said mark, said tamper detection for detecting attempts at tampering;

tamper resistance for a device used for enforcement of said policy;

tamper detection for a device used for enforcement of said policy, said tamper detection for detecting attempts at tampering;

cryptography within said marking;

cryptography for communication with output devices;

encryption of marks;

encryption of communication with output devices;

encryption of communications concerning said distribution policy;

utilizing a rule based distribution policy to derive a policy for a given document;

rule based policy analyzing;

utilizing a document management system for control of distribution policy over a plurality of documents;

integration with a document management system;

importing of documents;

enforcing a document retention policy;

access control;

utilizing a personnel identification device operable to identify personnel in association with said documents;

utilizing a personnel identification device operable to identify personnel attempting to perform an action related to said document;

access control to at least one storage device;

access control to at least one storage device for enforcement by said storage device;

utilizing Optical Character Recognition to analyze the contents of documents in output form;

utilizing Optical Character Recognition to analyze the contents of marks embedded within documents in output form;

inserting marks in the form of bar codes and utilizing bar code reading to identify said marks;

utilizing tamper resistant hardware; and triangulation for position location.

25. A method according to claim 19, further comprising defining at least two zones, such that a document is allowed to be in a first restricted zone, and is not allowed to be in a second, non-restricted, zone, and wherein said enforcing comprises actions preventing transfer of said output form from said first zone to said second zone.

26. A method according to claim 25, wherein said enforcing comprises selecting at least one of the following not allowing the creation of copies of said documents within said second zone;

monitoring exits of said first zone utilizing marking detection; and monitoring the entrances of said second zone utilizing marking detection.

27. A method according to claim 19, further comprising defining at least two classes of documents, providing each class with a mark allowing said class to be distinguished, applying a different distribution policy for each class, defining at least three zones, defining that a first of said classes is allowed to be in a first restricted zone, defining that said first class is not allowed to be in a second restricted zone, defining that a second of said classes is allowed to be in said first restricted zone, defining that said second class is allowed to be in said second restricted zone, defining that said second class is not allowed to be in a third non-restricted zone, defining that said first class is not allowed to be in said third not restricted zone, and wherein said enforcing comprises actions controlling transfer of said output form between said respective zones in accordance with said definitions.

28. A method according to claim 27, wherein said enforcing comprises selecting at least one of:

not allowing the creation of copies of documents of said first class within said second restricted zone;

monitoring the exits of said first restricted zone utilizing marking detection;

monitoring the exits of said second restricted zone utilizing marking detection;

monitoring the entrances of said second restricted zone utilizing marking detection devices; and monitoring the entrances of said third not restricted zone utilizing marking detection.

29. A method according to claim 19, wherein said marking comprises indication about at least one of the following:

distribution policy related information for an associated document;

distribution policy related information;

reference to a database;

reference to a database comprising distribution policy related information for an associated document;

reference to a database comprising distribution policy related information; and an identification of an associated document.

30. A method according to claim 19, wherein said marking comprise indication about at least one of the following:

information about the contents of an associated document;

allowed recipients information for an associated document page number information for the page of a copy of an associated document;

copy number information for a copy of an associated document;

copy identification information for a copy of an associated document;

author identity information for an associated document;

managing personnel identity, information for an associated document;

classification level information for an associated document;

printing permission information for an associated document;

copying permission information for an associated document;

removal from restricted zone permission information for an associated document;

usage restriction information for an associated document; and access control information for an associated document.

31. A method according to claim 19, further comprising embedding marking detection functionality into at least one of the following devices:
- a portable media writing device;
- an optical portable media writing device;
- a magnetic portable media writing device;
- a CD writer;
- a DVD writer;
- a diskette drive;
- a magnetic tape writer;
- a zip disk drive;
- a flash memory card writing device;
- a portable storage device interface;
- a USB interface;
- a bluetooth interface;
- a firewire interface;
- a IDE interface;
- a SCSI interface;
- a TCP/IP interface;
- a infrared interface;
- a wireless interface; and
- a RF interface.

32. A method according to claim 19, further comprising embedding marking detection functionality into at least one of the following devices:
- a scanning device;
- a scanner;
- a printing device;
- a printer;
- a plotter;
- a copying device;
- a photocopier;
- a fax machine;
- a document destruction device; and
- a shredder.

33. A method according to claim 32, further comprising embedding said marking detection functionality into a document destruction device, thereby to enable said distribution policy enforcement facilitation to monitor at least one of the following:
- the number of copies of said document that have been created and not destroyed;
- the number of copies of said document that have been created and destroyed;
- the identity of copies of said document that have been created and not destroyed;
- the identity of copies of said document that have been created and destroyed;
- the identity of pages of copies of said document that have been created and not destroyed;
- the identity of pages of copies of said document that were created and destroyed;
- the identity of sections of copies of said document that have been created and not destroyed; and
- the identity of sections of copies of said document that have been created and destroyed.

34. A method according to claim 32, further comprising embedding said marking detection functionality into a document destruction device, thereby to enable said distribution policy enforcement facilitation module to monitor at least one of the following:
- identities of persons possessing copies of said documents that have been created and not destroyed;
- identities of persons possessing copies of said document that have been created and not destroyed;
- identities of persons possessing pages of copies of said documents which have been created and not destroyed;
- identities of persons possessing sections of copies of said documents which have been created and not destroyed;
- identities of persons possessing copies of said documents that have been created and not destroyed, said identity being discerned by utilizing a personnel identification device;
- identities of persons possessing copies of said documents that have been created and not destroyed, said identity being discernable by utilizing a personnel identification device;
- identities of persons possessing pages of copies of said documents that have been created and not destroyed, said identity being discernable by utilizing a personnel identification device; and
- identities of persons possessing sections of copies of said documents that have been created and not destroyed, said identity being discernable by utilizing a personnel identification device.

35. A method according to claim 19, wherein said output form of said document comprises at least one of one of the following:
- a printed copy of said document;
- a digital copy of said document;
- a copy of said document stored on portable media;
- a copy of said document stored on portable storage device;
- a copy of said document stored an optical portable media;
- a copy of said document stored on a magnetic portable media;
- a copy of said document stored an optical media;
- a copy of said document stored on a magnetic media;
- a copy of said document stored on a CD;
- a copy of said document stored on a DVD;
- a copy of said document stored on a diskette;
- a copy of said document stored on a magnetic tape;
- a copy of said document stored on a zip disk; and
- a copy of said document stored on a flash memory card.

36. A method according to claim 19, wherein said distribution policy comprises a retention policy.

37. A system for enforcing a distribution policy associated with an electronic document comprising:
- an output device operable to produce an output form of said electronic document;
- a policy reference component operable to determine a distribution policy for said document;
- a marking module operable to embed a marking indicating at least the existence of said distribution policy on an output form of said electronic document produced by said output device, said marking being readable to enforce said associated marking policy, said policy reference component operable to instruct said marking module a marking detection device operable to detect marking embedded in said output;
- a distribution policy enforcement facilitation module, wherein said marking detection device is operable to notify said distribution policy enforcement facilitation module about detection of said marking, and wherein said distribution policy enforcement facilitation module is operable to perform a policy enforcement action on said output form according to said notification.

38. A system according to claim 37, wherein said marking comprise at least one of the following:
- an arrangement embedded into said output that can be detected using electromagnetic means;

a radio frequency remote identification device;
an electronic circuit;
an electronic resonant circuit;
an electronic resonant circuit comprising a capacitor and a coil;
matched dipole antenna;
radiation emitting material;
magnetic substance;
antenna;
microwave detectable component;
excite-able quantum system;
piezoelectric component; and
acoustic resonator.

39. A system according to claim 37, wherein said output comprises printed paper, and said marking comprises at least one of the following:
an apparatus embedded in said paper;
conductive ink;
printable electronic component;
magnetic ink;
a conductive segment;
detectable chemicals;
barcode; and
visible marking.

40. A system according to claim 37, wherein said marking comprise at least one of the following:
marking which is not substantially visually perceptible;
marking which is not substantially visually discernable from a background;
a marking comprising a plurality of layers;
a plurality of markings;
a plurality of layers of markings, each layer comprising different information;
a plurality of markings, each comprising different information;
a plurality of different markings each layer comprising a different marking technique;
a plurality of layers of markings each layer comprising several different marking techniques;
marking which is substantially difficult to remove;
marking which is difficult to substantially damage;
marking operable to be localized; and
marking operable to be localized by triangulation.

41. A system according to claim 37 wherein said policy enforcement action comprising at least one of the following;
logging said notification;
reporting said notification;
logging and reporting said notification;
providing an alert;
sounding an alarm;
obstructing the exit of said document from a restricted area;
obstructing the exit of said document from a restricted area by closing an exit;
preventing a copying device from copying said document;
preventing a writing device from writing said document to digital media;
preventing a writing device from writing said document on unmarked digital media;
preventing a copying device from making an unmarked copy of said detected marked document; and
causing a copying device to embed marking on copies it creates following said detection.

42. A system according to claim 37, wherein said marking comprises indication about at least one of the following:
distribution policy related information for an associated document;
distribution policy related information;
reference to a database;
reference to a database comprising distribution policy related information for an associated document;
reference to a database comprising distribution policy related information; and
an identification of an associated document.

43. A system according to claim 37, wherein said marking comprise indication about at least one of the following:
information about the contents of an associated document;
allowed recipients information for an associated document page number information for the page of a copy of an associated document;
copy number information for a copy of an associated document;
copy identification information for a copy of an associated document;
author identity information for an associated document;
managing personnel identity, information for an associated document;
classification level information for an associated document;
printing permission information for an associated document;
copying permission information for an associated document;
removal from restricted zone permission information for an associated document;
usage restriction information for an associated document; and
access control information for an associated document.

44. A system according to claim 37, further comprising a marking detection device embedded into at least one of the following devices:
a portable media writing device;
an optical portable media writing device;
a magnetic portable media writing device;
a CD writer;
a DVD writer;
a diskette drive;
a magnetic tape writer;
a zip disk drive;
a flash memory card writing device;
a portable storage device interface;
a USB interface;
a bluetooth interface;
a firewire interface;
a IDE interface;
a SCSI interface;
a TCP/IP interface;
a infrared interface;
a wireless interface; and
a RF interface.

45. A system according to claim 37, further comprising a marking detection device embedded into at least one of the following devices:
a scanning device;
a scanner;
a printing device;
a printer;
a plotter;
a copying device;
a photocopier;
a fax machine;
a document destruction device; and
a shredder.

46. A system according to claim 45, further comprising a marking detection device embedded into a document destruction device, operable to enable said distribution policy enforcement facilitation module to monitor at least one of the following:

the number of copies of said document that have been created and not destroyed;

the number of copies of said document that have been created and destroyed;

the identity of copies of said document that have been created and not destroyed;

the identity of copies of said document that have been created and destroyed;

the identity of pages of copies of said document that have been created and not destroyed;

the identity of pages of copies of said document that were created and destroyed;

the identity of sections of copies of said document that have been created and not destroyed; and the identity of sections of copies of said document that have been created and destroyed.

47. A system according to claim 45, further comprising a marking detection device embedded into a document destruction device, operable to enable said distribution policy enforcement facilitation module to monitor at least one of the following:

identities of persons possessing copies of said documents that have been created and not destroyed;

identities of persons possessing copies of said document that have been created and not destroyed;

identities of persons possessing pages of copies of said documents which have been created and not destroyed;

identities of persons possessing sections of copies of said documents which have been created and not destroyed;

identities of persons possessing copies of said documents that have been created and not destroyed, said identity being discerned by utilizing a personnel identification device;

identities of persons possessing copies of said documents that have been created and not destroyed, said identity being discernable by utilizing a personnel identification device;

identities of persons possessing pages of copies of said documents that have been created and not destroyed, said identity being discernable by utilizing a personnel identification device; and identities of persons possessing sections of copies of said documents that have been created and not destroyed, said identity being discernable by utilizing a personnel identification device.

48. A system according to claim 37, wherein said output form of said document comprises at least one of one of the following:

a printed copy of said document;

a digital copy of said document;

a copy of said document stored on portable media;

a copy of said document stored on portable storage device;

a copy of said document stored an optical portable media;

a copy of said document stored on a magnetic portable media;

a copy of said document stored an optical media;

a copy of said document stored on a magnetic media;

a copy of said document stored on a CD;

a copy of said document stored on a DVD;

a copy of said document stored on a diskette;

a copy of said document stored on a magnetic tape;

a copy of said document stored on a zip disk; and a copy of said document stored on a flash memory card.

49. A system according to claim 37, wherein said distribution policy comprises a retention policy.

* * * * *